(12) United States Patent
Lugtigheid

(10) Patent No.: US 11,242,247 B2
(45) Date of Patent: Feb. 8, 2022

(54) METHOD FOR PRODUCING METAL BOROHYDRIDE AND MOLECULAR HYDROGEN

(71) Applicant: H2FUEL CASCADE B.V., Voorschoten (NL)

(72) Inventor: Gerardus Wilhelmus Lugtigheid, Spijkenisse (NL)

(73) Assignee: H2FUEL CASCADE B.V., Voorschoten (NL)

( * ) Notice: Subject to any disclaimer, the term of this patent is extended or adjusted under 35 U.S.C. 154(b) by 533 days.

(21) Appl. No.: 15/773,916

(22) PCT Filed: Nov. 7, 2016

(86) PCT No.: PCT/NL2016/050776
§ 371 (c)(1),
(2) Date: May 4, 2018

(87) PCT Pub. No.: WO2017/078534
PCT Pub. Date: May 11, 2017

(65) Prior Publication Data
US 2020/0270131 A1    Aug. 27, 2020

(30) Foreign Application Priority Data
Nov. 6, 2015 (NL) .................................... 2015742
Mar. 7, 2016 (NL) .................................... 2016374

(51) Int. Cl.
*C01B 6/17*    (2006.01)
*C01B 3/06*    (2006.01)
(52) U.S. Cl.
CPC ............... *C01B 6/17* (2013.01); *C01B 3/065* (2013.01)
(58) Field of Classification Search
CPC ................................ C01B 6/17; C01B 3/065
See application file for complete search history.

(56) References Cited

U.S. PATENT DOCUMENTS 2,534,533 A   12/1950  Schlesinger et al.
3,101,592 A    8/1963  Robertson et al.
(Continued)

FOREIGN PATENT DOCUMENTS

CN   1524312 A   8/2004
CN   1913207 A   2/2007
(Continued)

OTHER PUBLICATIONS

Wu et al. "Process for Regeneration of Sodium Borate to Sodium Borohydride for Use as a Hydrogen Storage Source" US DoE Hydrogen Program, 2006 Annual Progress Report (Year: 2006).*
(Continued)

*Primary Examiner* — Anthony J Zimmer
*Assistant Examiner* — Syed T Iqbal
(74) *Attorney, Agent, or Firm* — Nixon & Vanderhye

(57) ABSTRACT

Disclosed is a method for producing a metal borohydride and/or $H_2$, including: A. producing a metal borohydride in a synthesis process, in which $H_2$ is a reactant and the reaction further takes metal hydroxide and boron oxide or further takes metal boron oxide; B. producing $H_2$ in a chemical reaction process, in which metal borohydride produced in step A and $H_2O$ are reactants, the amount of $H_2$ produced in step B being larger than the amount of $H_2$ required as a reactant in step A for the same amounts of metal borohydride as a reactant and a reaction product in steps B and A, respectively; and C. providing $H_2$ produced in step C to step A, and repeating steps A, B and C. Part of the metal borohydride and/or $H_2$ is withdrawn while leaving an amount of metal borohydride and $H_2$, respectively, so as to allow repeating steps A-C.

19 Claims, 16 Drawing Sheets

(56) References Cited

U.S. PATENT DOCUMENTS

| | | | |
|---|---|---|---|
| 3,346,506 | A | 10/1967 | Beumel, Jr. |
| 3,980,280 | A | 9/1976 | Benson |
| 4,302,217 | A | 11/1981 | Teitel |
| 5,542,398 | A | 8/1996 | Marcon |
| 5,560,710 | A | 10/1996 | Klocke et al. |
| 6,524,542 | B2 | 2/2003 | Amendola et al. |
| 6,745,801 | B1 | 6/2004 | Cohen et al. |
| 6,802,875 | B1 | 10/2004 | Kimbara et al. |
| 7,784,501 | B2 | 8/2010 | Gershtein et al. |
| 7,784,502 | B2 | 8/2010 | Gershtein et al. |
| 8,307,863 | B2 | 11/2012 | Noujima et al. |
| 8,807,180 | B2 | 8/2014 | O'Connor |
| 9,054,354 | B2 | 6/2015 | Baldini et al. |
| 2003/0092877 | A1* | 5/2003 | Amendola ............ C01B 6/21 528/394 |
| 2004/0052722 | A1 | 3/2004 | Jorgensen et al. |
| 2004/0115493 | A1* | 6/2004 | Kim .................. H01M 8/04201 429/513 |
| 2006/0196112 | A1 | 9/2006 | Berry et al. |
| 2008/0025880 | A1 | 1/2008 | Shurtleff et al. |
| 2009/0304558 | A1 | 12/2009 | Patton et al. |
| 2010/0012499 | A1 | 1/2010 | Zhou et al. |
| 2010/0143240 | A1 | 6/2010 | Najim et al. |

FOREIGN PATENT DOCUMENTS

| | | |
|---|---|---|
| CN | 1914757 A | 2/2007 |
| CN | 101008336 A | 8/2007 |
| CN | 101315053 A | 12/2008 |
| EP | 1 375 419 A2 | 1/2004 |
| EP | 1 787 952 A1 | 5/2007 |
| JP | 2006-143537 A | 6/2006 |
| JP | 2010/013290 A | 1/2010 |
| JP | 2012-516281 A | 7/2012 |
| JP | 2014-181174 A | 9/2014 |
| RU | 2233511 C1 | 7/2004 |
| WO | 01/85606 A1 | 11/2001 |
| WO | 02/062701 A1 | 8/2002 |
| WO | 02/066369 A1 | 8/2002 |
| WO | 2008/144038 A1 | 11/2008 |
| WO | 2010/087698 A2 | 8/2010 |
| WO | 2013/182208 A1 | 12/2013 |

OTHER PUBLICATIONS

Search Report issued in Eurasian Patent Application No. 201790053 dated Jul. 21, 2017 with partial English machine translation provided.

International Search Report issued in International Application No. PCT/NL2016/050775 dated Feb. 2, 2017.

Breault, R. et al., "Hydrogen Transmission/Storage with a Metal Hydride/Organic Slurry," Proceedings of the 1998 U.S. DOE Hydrogen Program Review.

Duffin, A. et al., "Electronic structure of aqueous borohydride: a potential hydrogen storage medium," Phys. Chem. Chem. Phys., 2011, 13, 17077-17083.

Gervasio, D. et al., "Properties of aqueous alkaline sodium borohydride solutions and by-products formed during nydrolysis," Fuel Cell Design, Fabrication and Materials Selection Workshop, University Illinois Urbana Champaign, Jul. 26, 2005.

McClaine, A. et al., "Hydrogen Transmission/Storage with a Metal Hydride-Organic Slurry and Advanced Chemical Hydride/Hydrogen for PEMFC Vehicles," Proceedings of the 2000 U.S. DOE Hydrogen Program Review.

Simagina, V. et al., "Progress in the catalysts for H2 generation from NaBH4 fuel," Current Topics in Catalysis, vol. 10, 2012, pp. 147-165.

Tegeder, V. et al., "Thermoelectricity," Ullmann's Encyclopedia of Industrial Chemistry, 2005, Wiley-VCH Verlag GmbH & Co. KGaA, Weinheim.

Wikipedia, "Solubility table," URL:https://en.wikipedia.org/wiki/Solubility_table.

Wu, Y., "Process for the Regeneration of Sodium Borate to Sodium Borohydride for Use as a Hydrogen Storage Source," Millennium Cell Inc., May 24, 2005.

Wu, Y. et al., "Process for Regeneration of Sodium Borate to Sodium Borohydride for Use as a Hydrogen Storage Source," DOE Hydrogen Program, FY 2006 Annual Progress Report, pp. 372-376.

Wu, Y.,"Hydrogen Storage via Sodium Borohydride: Current Status, Barriers, and R&D Roadmap," Presented at GCEP-Stanford University, Apr. 14-15, 2003.

ç. çakanyildirim et al.: "The Production of NaBH 4 from Its Elements by Mechano-chemical Reaction and Usage in Hydrogen Recycle", Energy Sources. Part A. Recovery, Utilization, and Environmental Effects, vol. 33, No. 20, Jul. 29, 2011 (Jul. 29, 2011), pp. 1912-1920, XP055302494, ISSN: 1556-7036, DOI 10.1080/15567030903503175.

Kojima Y et al: "Recycling process of sodium metaborate to sodium borohydride", International Journal of Hydrogen Energy, Elsevier Science Publishers B.V., Barking, GB, vol. 28, No. 9, Sep. 1, 2003 Sep. 1, 2003, pp. 989-993, XP027472000, ISSN: 0360-3199, [retrieved on Sep. 1, 2003,], DOI: 10.1016/S0360-3199(02)00173-8.

International Search Report, dated Jun. 7, 2017, from corresponding PCT/NL2016/050776 application.

Bauer, S.H., "Reanalysis of the Electron Diffraction Data on Be(BH4)2 and Al(BH4)3," J. Am. Chem. Soc. 1950, 72, 1,622-623.

Boynuegri, T.A. and Guru, M., "Catalytic dehydrogenation of calcium borohydride by using hydrogel catalyst," International Journal of Hydrogen Energy 24 (2017) 17869-17873.

Duffin, A.M. et al., "Electronic structure of aqueous borohydride: a potential hydrogen storage medium," Phys. Chem. Chem. Phys., 2011, 13, 17077-17083.

Grochala, W. and Edwards, P., "Thermal Decomposition of the Non-lnterstitial Hydrides for the Storage and Production of Hydrogen," Chem. Rev. 2004, 104, 1283-1315.

Leardini, F. et al., "Reaction pathways for hydrogen desorption from magnesium hydride/hydroxide composites: bulk and interface effects," Phys. Chem. Chem. Phys., 2010, 12, 572-577.

Miwa, K et al., "First-principles study on thermodynamical stability of metal borohydrides: Aluminum borohydride Al(BH4)3," Journal of Alloys and Compounds 446-447 (2007) 310-314.

Soloveichik, G., "Metal Borohydrides as Hydrogen Storage Materials," Material Matters 2007, 2.2, 11.

Wang, M. et al., "Magnesium borohydride hydrolysis with kinetics controlled by ammoniate formation," International Journal of Hydrogen Energy 44 (2019) 7392-7401.

* cited by examiner

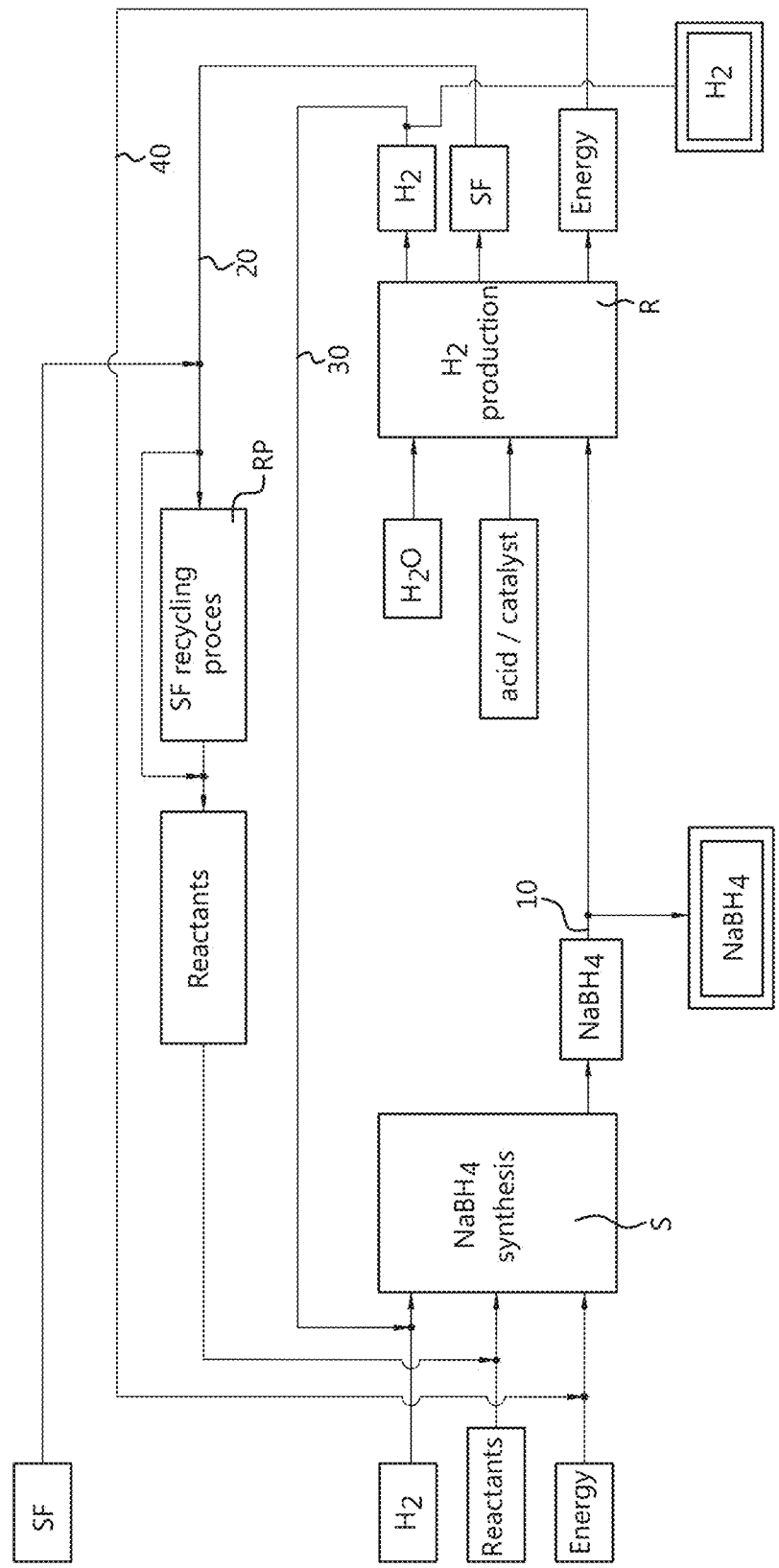

METHOD FOR PRODUCING METAL BOROHYDRIDE AND MOLECULAR HYDROGEN

FIELD OF THE INVENTION

The invention relates to a method for producing at least one of a metal borohydride and $H_2$. The invention further relates to an apparatus for carrying out the method.

BACKGROUND OF THE INVENTION

The considerable costs involved in the production, storage and transportation of $H_2$ (referred to as hydrogen, a hydrogen atom will be referred to as atomic hydrogen) prevent its fast and wide introduction. Its breakthrough is only expected to occur in case the price of hydrogen has generally decreased to a present price level of electricity, gasoline, diesel, natural gas, etcetera per unit of produced energy, such as costs per mega joule (€/MJ).

Presently, three types of production processes are known in which hydrogen (hydrogen gas) is produced:
- As a byproduct of another chemical process, for which the energy required to release the hydrogen is of secondary importance;
- A steam reforming technique, for which the energy required to produce hydrogen is about 140 MJ/kgH2 (141.1 kJ/mole); and
- An electrolysis technique, for which the energy required to produce hydrogen is 204.5 MJ/kgH2 (206.1 kJ/mole).

When the environmental $CO_2$ footprint of the hydrogen production is taken into account then a zero $CO_2$ footprint can only be obtained by using electricity produced through sources such as wind, water, geothermic sources and solar. Nuclear power could be employed as an alternative, in which use of thorium as a fuel is strongly preferred in view of safety, storage and environmental considerations. The use of biomass in the steam reforming technique is being considered as $CO_2$ neutral.

Hydrogen is used in a gas form. Its conversion to heat generally is done using burning of a catalyst, and its conversion to electrical energy generally by employing a fuel cell. The following disadvantages can be observed:

The low specific weight of hydrogen implies that hydrogen gas fuel requires a lot of space per kilogram, which makes transport by road or over water costly. A core problem in the use of hydrogen for energy generation is its energy loss with present production methods; and energy is lost in hydrogen storage when cooling or compressing the hydrogen.

It has been tried to solve the transport problem for long distances by liquefying the hydrogen. In practical use such a technique showed many disadvantages in the form of costs and complexity involved. It requires a lot of energy to keep the hydrogen cold enough for keeping it in a liquid state. Evaporation generally starts after about 14 days when the hydrogen is stored in a Dewar, and will start immediately in a normally isolated container. The hydrogen evaporated can be used as a fuel to, for instance, power the vessel or truck used for transportation. Based on experience, in practical applications, one has raised the pressure of compressed hydrogen from 300 bar to 700 bar to have a sufficient transport range, which involves a loss of about 6% of the hydrogen for its storage during transport.

Hydrogen may also be stored in a metal borohydride, from which it subsequently can be released to obtain $H_2$. The hydrogen generation reaction has the metal borohydride, for instance, $NaBH_4$, as a starting point. Several production routes for $NaBH_4$ have been looked into. Bo Richter and Torben Rene Jensen from the University of Aarhus in Denmark, for instance, have disclosed in WO 2013/182208 a process in which sodium is converted to sodium hydride, which is then subsequently ball-milled and coupled with $BH_3$ using a diluent at low pressure and temperature to obtain $NaBH_4$. It is further known to synthesize $NaBH_4$ in a Schlesinger type process. Research by the US Department of Energy (US DoE) has shown that it is not required to follow the full path in the Schlesinger process, but that a shorter path may be followed to synthesize $NaBH_4$.

Ying Wu has published in 2005 an electrolysis type of process (https://www.hydrogen.energy.gov/pdfs/review05/st12_wu.pdf: Process for the Regeneration of Sodium Borate to Sodium Borohydride for Use as a Hydrogen Storage Source), which proved to be more cost effective due to the fact that one does not start with NaCl, but with NaOH. Starting with NaOH may also prove advantageous for using the worldwide surplus of NaOH. This process has been described by Ying Wu in 2006 in a US Department of Energy (US DoE) publication (https://www.hydrogen.energy.gov/pdfs/progress06/iv_b_1_wu.pdf: IV.B.1 Process for Generation of Sodium Borate to Sodium Borohydride for Use as a Hydrogen Storage Source; Ying Wu; 2006), especially in relation to FIG. 3 of the publication.

In the reaction of the metal borohydride with water, a number of reaction products is formed into a spent fuel mixture. Some of these reaction products may be recycled again. However, the known processes for the production of a metal borohydride and its use as a fuel are still quite inefficient in the energy required and the reaction products in the spent fuel.

SUMMARY OF THE INVENTION

It is an objective of the invention to provide a favorable process for the production of a metal borohydride and $H_2$.

It is another or alternative objective of the invention to provide a process for the production of a metal borohydride and $H_2$, which provides reaction products that can be readily be recycled within the process.

It is yet another or alternative objective of the invention to provide a process for the production of a metal borohydride and $H_2$, which provides a minimum of waste products.

It is yet another or alternative objective of the invention to store and produce $H_2$ at favorable amounts of energy required.

It is yet another or alternative objective of the invention to provide a process to provide energy storage and production with a minimum of energy loss and waste.

It is yet another or alternative objective of the invention to provide a process for storing, transporting and distributing energy at a low risk level.

It is yet another or alternative objective of the invention to provide a process for storing, transporting, distributing and producing energy which can easily be scaled to desired levels.

At least one of the above objectives is achieved by a method for producing at least one of a metal borohydride and $H_2$, the method comprising the following steps:

A. producing a metal borohydride in a synthesis process (S, S1, S2, S3), in which $H_2$ is a reactant, by at least one of:

A1. providing metal hydroxide, $B_2O_3$ and $H_2$ so as to allow the synthesis process to proceed and to yield metal borohydride, optionally metal borohydride and $O_2$ according to the overall reaction formula $$4Me(OH)_n + 2nB_2O_3 + 6nH_2 \rightarrow 4Me(BH_4)_n + 5nO_2; \text{ and}$$

A2. providing metal boron oxide and $H_2$ so as to allow the synthesis process to proceed and to yield metal borohydride, especially metal borohydride and $O_2$; according to the overall reaction formula $$Me(BO_2)_n + 2nH_2 \rightarrow Me(BH_4)_n + nO_2,$$

in which Me is a metal and n is the valance of the metal ion;

B. producing $H_2$ in a chemical reaction process (R, R1, R2), in which the metal borohydride and/or the metal boron oxide produced in step A and $H_2O$ are reactants, the amount of $H_2$ produced in step B being larger than the amount of $H_2$ required as a reactant in steps A1 and/or A2 for the same amounts of metal borohydride and metal boron oxide, respectively, as a reactant and a reaction product in steps B and A, respectively; and C. providing $H_2$ produced in step C to step A, and repeating steps A, B and C, wherein a part of at least one of metal borohydride and/or metal boron oxide and $H_2$ produced in steps A and B, respectively, is withdrawn while leaving an amount of metal borohydride and $H_2$, respectively, to allow repeating steps A, B and C.

The reaction mechanisms of the method provide very energy efficient steps for producing a metal borohydride and/or $H_2$. The method can be easily scaled from low power requirements to very high power requirements. Steps A and B can be done in separate housings or within a single housing, and can be done in a sequential "one pot" process.

In an embodiment step A requires energy in the form of heat, energy in the form of heat is produced in step B, and the heat produced in step B is least partly provided to step A.

In an embodiment the processes of steps A and B are selected such that reaction products of step B are reactants of step A.

In an embodiment the processes of steps A and B are selected such that reaction products of step B are reactants of step A according to at least one of the overall chemical reaction formulas for the chemical reaction step:

$$4Me(BH_4)_n + 10nH_2O \rightarrow 4Me(OH)_n + 2nB_2O_3 + 16nH_2; \text{ and} \qquad B1.$$

$$Me(BH_4)_n + 2nH_2O \rightarrow Me(BO_2)_n + 4nH_2. \qquad B2.$$

In an embodiment the ratio of metal borohydride and $H_2O$ is selected to obtain at least one of
increasing a production rate of $H_2$, and
yielding reaction products that are at least one of
reactants of step A, and
reactants of a recycling process yielding reaction products that are reactants of step A.

In an embodiment the ratio of the molar amounts of borohydride, $BH_4$, groups in the metal borohydride and $H_2O$ is at least $BH_4:H_2O=2:5$.

In an embodiment at least one of a catalyst and an acid is added in step B to promote at least one chemical reaction in the chemical reaction process to obtain at least one of
increasing a production rate of $H_2$, and
yielding reaction products that are at least one of
reactants of step A, and
reactants of a recycling process yielding reaction products that are reactants of step A.

In an embodiment a metal hydroxide is added in step B to obtain at least one of
decreasing a production rate of $H_2$, and
yielding reaction products that are at least one of
reactants of step A, and
reactants of a recycling process yielding reaction products that are reactants of step A.

In an embodiment step A is carried out in a first apparatus setup, step B is carried out in a second apparatus setup, an amount of the metal borohydride is provided from the first apparatus setup to the second apparatus setup, and an amount of $H_2$ is provided from the second apparatus setup to the first apparatus setup for cyclically carrying out steps A and B in the first and second apparatus setups.

In an embodiment $H_2O$ is provided in ultrapure water (UPW).

In an embodiment the UPW satisfies at least one of having an electrical conductance below 1 µS/cm, especially below 0.5 µS/cm, especially below 0.1 µS/cm, especially below 0.06 µS/cm, and having an Electronics and Semiconductor Grade Water ASTM Type E-1 classification or better.

In another aspect the invention provides for a method for producing energy, the method comprising the step of
producing $H_2$ employing the method according to any one of the preceding claims; and
providing $H_2$ from the preceding step and $O_2$ to allow a chemical reaction to proceed and to yield energy, optionally according to the reaction formula $$H_2 + O_2 \rightarrow 2H_2O.$$

In yet another aspect the invention provides for a method for producing a metal borohydride, wherein the method comprises at least one of the steps of
providing metal hydroxide, $B_2O_3$ and $H_2$ to allow a synthesis process to proceed and to yield metal borohydride, optionally metal borohydride and $O_2$, wherein the synthesis process proceeds according to the reaction formula $$4Me(OH)_n + 2nB_2O_3 + 6nH_2 \rightarrow 4Me(BH_4)_n + 5nO_2; \text{ and}$$

providing metal boron oxide and $H_2$ so as to allow a synthesis process to proceed and to yield metal borohydride, especially metal borohydride and $O_2$; according to the overall reaction formula $$Me(BO_2)_n + 2nH_2 \rightarrow Me(BH_4)_n + nO_2,$$

in which Me is a metal and n is the valence of the metal ion.

In an embodiment the metal, Me, is at least one of lithium, Li, sodium, Na, and potassium, K.

In yet another aspect the invention provides for an apparatus for carrying out any one of the above methods.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which FIG. 1 shows a schematic representation of an embodiment of the invention;

DETAILED DESCRIPTION OF EMBODIMENTS

Figure 2A:
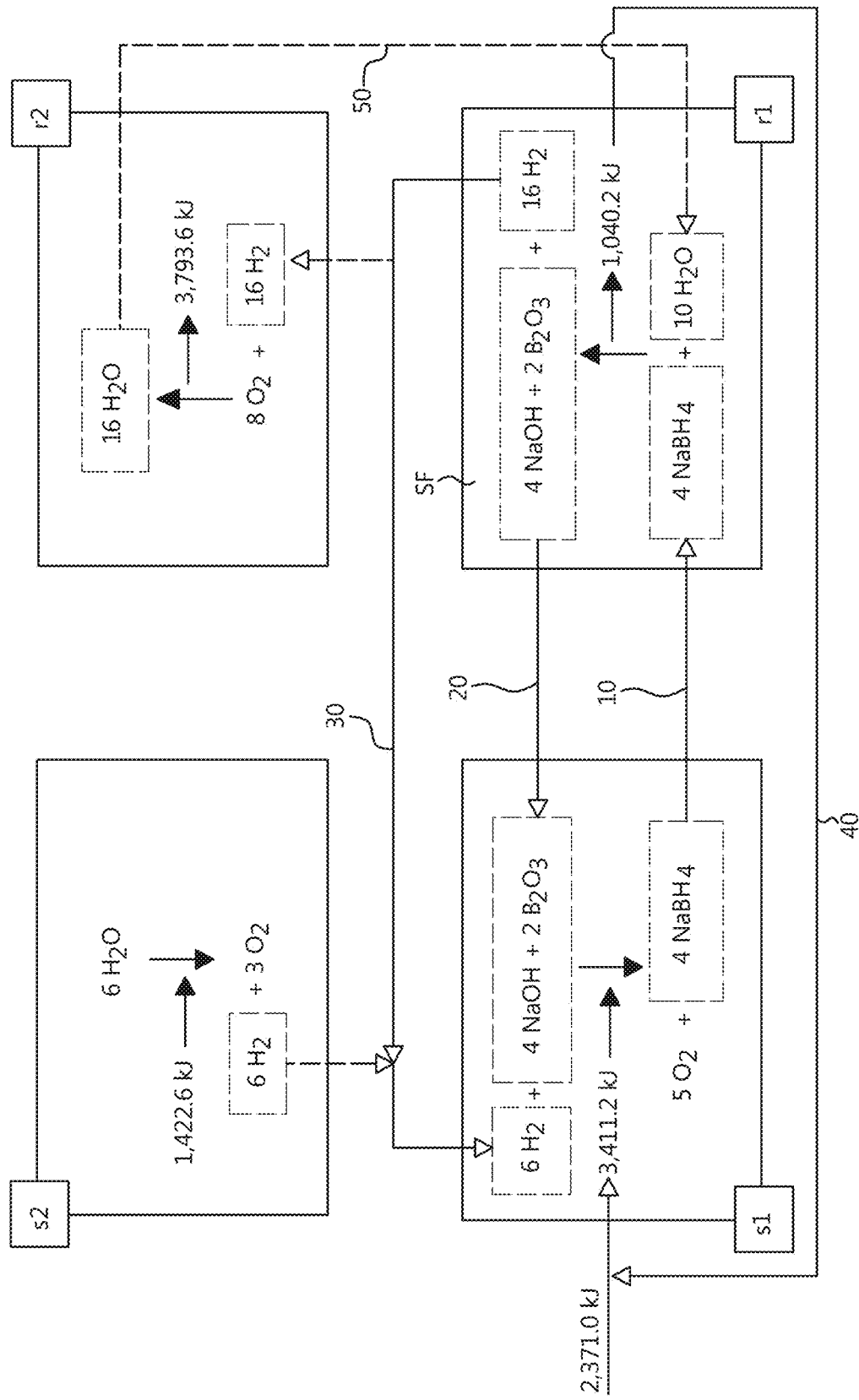
FIG. 2A shows a representation of the relation between reaction formulas involved in an embodiment of the invention.

A schematic representation of an embodiment of the method of the invention is shown in FIG. 1. A metal borohydride, $NaBH_4$ in the embodiment shown, is produced from $H_2$ and some other reactants in a synthesis process S. The synthesis process requires the input of energy. Dependent on the actual partial processes involved in the synthesis processes, the energy, for instance, may be required as pressure and/or heat to raise the temperature of the reactants or may be inputted in an electrolysis process. Other types of processes may involve other types of energy as well.

The metal borohydride subsequently is provided, as indicated by arrow 10 to a metal borohydride chemical reaction process R that further involves $H_2O$ as a reactant. The metal borohydride chemically reacts with $H_2O$ and is decomposed into reaction products including $H_2$. The amount of $H_2$ produced in the reaction process R of metal borohydride and $H_2O$ is larger than the amount of $H_2$ used in the synthesis process S to synthesize a same amount of metal borohydride as decomposed in the reaction process R to produce $H_2$. The metal borohydride and $H_2O$ can be regarded as a fuel for the production of $H_2$ and the reaction products other than the $H_2$ produced can be referred to as a spent fuel SF.

The $H_2$ produced in process R is provided as a reactant into process S, as indicated by arrow 30, to again produce metal borohydride, which is again used to produce $H_2$ in process R, and so on. Apart from the $H_2$ produced in process R, also the reaction products in the spent fuel SF can be provided back to the synthesis process S, as indicated by arrow 20. The reaction products in the spent fuel SF from the metal borohydride and $H_2O$ reaction process R may have to be recycled first in a separate recycling process RP or may be used directly in the synthesis process S, as is also indicated in FIG. 1. Further, the reaction process R generally yields energy in the form of heat produced. The energy from reaction process R can also be provided back to the synthesis process S, as indicated by arrow 40. The metal borohydride and/or the H2 can be withdrawn from the process for use elsewhere. However, some of the metal borohydride and $H_2$ should remain to allow the production process to continue.

An acid and/or a catalyst can be provided into the reaction process R for $H_2$ production as well to promote at least one chemical reaction in the chemical reaction process. The acid and/or catalyst can be selected to obtain an increase in the production rate of $H_2$, and/or to yield reaction products that are reactants of step A and/or reactants of a recycling process yielding reaction products that are reactants of step A. Further a metal hydroxide may be added as well to the reaction process R for decreasing a production rate of $H_2$, and/or yielding reaction products that are reactants of step A, and/or reactants of a recycling process yielding reaction products that are reactants of step A. Another parameter that can be selected is the ratio of metal borohydride and $H_2O$. The ratio can be selected such as to obtain an increase in the production rate of $H_2$, and/or to yield reaction products that are reactants of step A, and/or reactants of a recycling process yielding reaction products that are reactants of step A. In an embodiment the ratio of the molar amounts of borohydride ($BH_4$) groups in the metal borohydride (Me($BH_4)_n$) and $H_2O$ is at least $BH_4:H_2O=2:5$. Various parameters are therefore available to tune the chemical reaction mechanisms in the reaction process of the metal borohydride and $H_2O$ for decreasing or decreasing the production rate of $H_2$ and to select favourable reaction products. Such process are in more detail disclosed in two Dutch patent applications filed on 7 Mar. 2016 and both invoking priority of Dutch patent application NL 2015742 filed on 6 Nov. 2015, the contents of which are incorporated herein by reference.

The quality of the water to supply $H_2O$ is very important for the production of $H_2$ as has been shown in WO 2010/087698 A2, which is incorporated herein by reference. The international publication generally discloses a production process for $H_2$, in which a metal borohydride is dissolved in water having a conductance of <0.5 µS/cm. The quality of water having such low conductance is qualified as ASTM Type E-1 grade water (Electronics and Semiconductor Grade Water), which is in this description referred to as ultrapure water (UPW). UPW in this description refers to water satisfying the above quality grade and/or water having a conductance of <1 µS/cm, especially <0.5 µS/cm, more especially <0.1 µS/cm, and more especially <0.06 µS/cm. Water having a conductance of <0.06 µS/cm is also being specified as having a resistivity of 18.2 MΩ or larger at 25° C. Further, such solution and such use of a borohydride fuel is generally in a nitrogen environment to avoid any reaction with $CO_2$ and $H_2O$ in ambient air.

The metal borohydride reacts very efficiently with $H_2O$ provided in water having a low conductance value as described above. A metal hydroxide, such as MeOH, can also be dissolved in the mixture to provide a stable fuel mixture. Preferably, the metal hydroxide is dissolved first in UPW, after which the metal borohydride is dissolved to obtain a fuel mixture that may be provided to reaction process R. The two Dutch patent applications invoking priority of NL 2015739 and referred to earlier disclose a fuel mixture of a metal borohydride, a metal hydroxide and ultrapure water, and a method for generating $H_2$ from such fuel mixture. The description, claims and drawings of those applications are incorporated by reference in the present disclosure. To accelerate the reaction for generating $H_2$, the pH value of the mixture can be decreased to a value of about pH=7 by adding an acid. For instance, HCl, is advantageously used as an acid, although another type of acid can be used as well, such as, for instance, citric acid. This is especially advantageous in mobile applications of the fuel mixture. In stationary applications a fuel mixture having a higher pH value can be employed. A catalyst may be used additionally or alternatively to using an acid for accelerating the reaction of the metal borohydride with $H_2O$.

$H_2$ from the reaction of the fuel mixture is subsequently used for energy production. Other reaction products can be collected in a spent fuel mixture SF. Various recycle processes are known and have been used and tested for NaOH and for any reaction products in the spent fuel, from which an appropriate one can be selected A metal borohydride has been shown to react with $H_2O$ to form $H_2$, for which the a stoichiometric ratio yields the following basic chemical reaction formula:

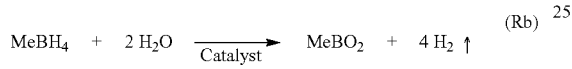  (Rb)

This basic reaction formula presents only one pathway for the reaction of a metal borohydride with $H_2O$. A number of reaction products may result from various chemical reaction pathways according to various reaction formulas which can occur at user locations under various circumstances. Reaction products in the spent fuel, that results from the fuel mixture after $H_2$ generation, under an abundance of UPW (ASTM type E-1) are shown in the table below.

|  | mole oxygen (per mole $NaBH_4$) [moles] | $H_2O$ required (add on 30% solution) [moles] | volume of $H_2O$ [millilitre] |
|---|---|---|---|
| * $NaB(OH)_4$ | 4 | 32 | 576 |
| $NaBO_2$—x $H_2O$ ** | 2 + x | 16 | 288 |
| $Na_2B_4O_7$ | 7/2 | 28 | 504 |
| $Na_2B_4O_7$—10 $H_2O$ | 17/2 | 68 | 1224 |
| $Na_2B_4O_6(OH)_2$—3 $H_2O$ | 11/2 | 44 | 792 |
| $Na_2B_4O_7$—5 $H_2O$ | 12/2 | 48 | 864 |
| $NaB_4O_5(OH)_4$—3 $H_2O$ | 12/2 | 48 | 864 |
| $NaB_4O_5(OH)_4$—8 $H_2O$ | 17/2 | 68 | 1224 |

* X-ray diffraction data of the Arizona State University indicate that $NAB(OH)_4$ is the by-product of the hydrolysis reaction (Don Gervasio, Michael Xu and Evan Thomas; Arizona State University; Tempe, AZ; 26 Jul. 2005).
** Progress in the catalysts for $H_2$ generation from $NaBH_4$ fuel; V. I. Simagina (4-3-36) (Hydrogen on Demand)

The present description primarily refers to sodium borohydride ($NaBH_4$) as a metal borohydride. Other examples of a metal borohydride are lithium borohydride ($LiBH_4$) and potassium borohydride ($KBH_4$). However, the method according to the invention is applicable to any metal borohydride, which can be referred to as $Me(BH_4)_n$, in which Me is a metal having a valance value n and thus a number n of borohydride groups $BH_4$ attached to it. A metal includes any material generally referred to as a metal, including alkali metals, transition metals and complex metals.

Various chemical reaction mechanism may be applicable to the synthesis process S and the reaction process R. An example is provided in FIG. 2A. FIG. 2A further shows the chemical reaction formulas for producing $H_2$ by electrolysis of $H_2O$ and for the reaction of $H_2$ and $O_2$ for the production of energy. The reaction mechanisms on the left-hand side require the input of energy, while the reaction mechanisms on the right-hand side yield energy. The reaction mechanisms together provide a circular overall process in that all reaction products of individual reaction mechanisms can be used again as reactants in the individual reaction mechanisms, as shown in FIG. 2A. The (mole) amounts used in the individual reaction formulas are matched to one another:

 (s2,FIG. 2A)

 (s1,FIG. 2A)

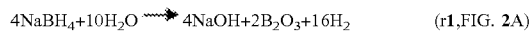 (r1,FIG. 2A)

 (r2,FIG. 2A)

Alternatively, the reaction formulas, in which the (mole) amounts used in the individual reaction formulas are not matched to one another, can be written as, respectively:

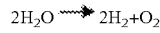

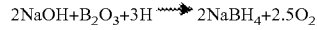

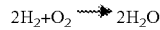

Figure 2B:
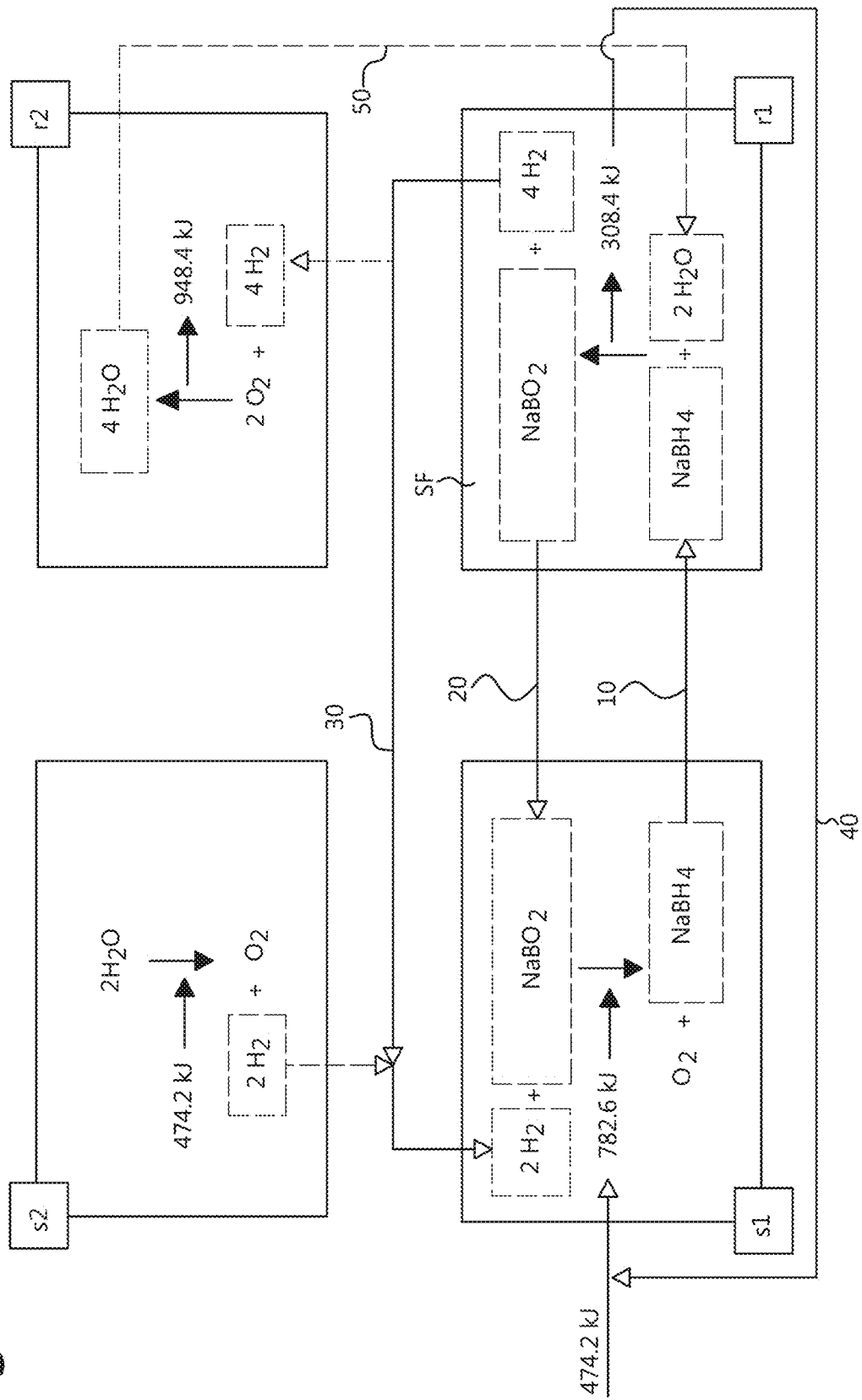
FIG. 2B shows a representation of the relation between reaction formulas involved in another embodiment of the invention.

Another set of possible reaction mechanisms is shown in FIG. 2B, in which the (mole) amounts used in the individual reaction formulas are also matched to one another:

 (s2,FIG. 2B)

 (s1,FIG. 2B)

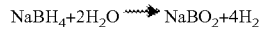 (r1,FIG. 2B)

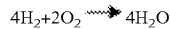 (r2,FIG. 2B)

In the same fashion as above, these reaction formulas may also be rewritten to individual reaction formulas that are not matched to one another.

The above reaction formulas are energetically very advantageous ones and are balanced, and are therefore extremely optimal reaction formulas. Reaction formulas s2 and r2 are known. Reaction formulas s1 and r1 are confirmed by the balance calculation tool for stoichiometric formulas of the WebOC.org website (http://nl.webqc.org/balance.php).

The basic values for the Gibbs energies and the molar masses of the materials in the reaction formulas are as shown in the table below.

|  | Gibbs energy [kJ/mole] | Molar mass [g/mole] | Gibbs energy [kJ/kg] |
|---|---|---|---|
| $O_2$ * | 0 | 32.0 | 0.0 |
| $H_2$ * | 0 | 2.0 | 0.0 |
| $H_2O$ ** | −237.1 | 18.0 | −13,160.5 |
| NaOH ** | −379.5 | 40.0 | −9,488.0 |
| $NaBO_2$ *** | −906.5 | 65.08 | −13,776.6 |
| $NaBH_4$ ** | −123.9 | 37.8 | −3,275.9 |
| $B_2O_3$ ** | −1,194.3 | 69.6 | −17,159.5 |

* https://en.wikipedia.org/wiki/List_of_standard_Gibbs_free_energies_of_formation
** Handbook of Chemistry and Physics, 76th edition
*** www.citrination.com First, the reaction formulas in relation to FIG. 2A are discussed. The following tables show the Gibbs energy per mole and the change (Δ) in Gibbs energy per the number of molecules in moles according to the reaction formulas, so, for example, 6 moles $H_2O$, 6 moles $H_2$ and 3 moles $O_2$ in formula s2. Reaction formula s2 is the known basic reaction process for the production of hydrogen from water. The chemical reaction consumes energy for the breaking up of the $H_2O$ molecule, while no (Gibbs) energy is released in the formation of $H_2$ and $O_2$, as is shown in the table below.

| FIG. 2A, Reaction s2: Initial $H_2$ production | | | |
|---|---|---|---|
| | Gibbs energy [kJ/mole] | # molecules [mole] | Δ Gibbs energy [kJ] |
| $H_2O$ | −237.1 | 6 | 1,422.6 |
| $H_2$ | 0 | 6 | 0 |
| $O_2$ | 0 | 3 | 0 |
| Reaction s2: | | | 1,422.6 |

Reaction formula s1 shows the reaction for the production of $NaBH_4$ from $H_2$ produced according to reaction mechanism s2 or reaction mechanism r1, and from NaOH and $B_2O_3$. NaOH is widely available. As a net result the chemical reaction according to formula s1 consumes energy as the table below shows.

| FIG. 2A, Reaction s1: $NaBH_4$ synthesis | | | |
|---|---|---|---|
| | Gibbs energy [kJ/mol] | # molecules [mole] | Δ Gibbs energy [kJ] |
| NaOH | −379.5 | 4 | 1,518.0 |
| $B_2O_3$ | −1,194.4 | 2 | 2,388.8 |
| $H_2$ | 0 | 6 | 0 |
| $NaBH_4$ | −123.9 | 4 | −495.6 |
| $O_2$ | 0 | 5 | 0 |
| Reaction s1: | | | 3,411.2 |

Both processes s2 and s1 according to the reaction formulas take energy. These processes, for instance, can be carried out at locations where carbon-free (zero carbon-footprint) produced energy, like wind power, hydropower, solar power and nuclear power, is available. Reaction mechanism s2 need not be carried out, or is carried out only in a start-up phase to provide $H_2$. In a later stage the $H_2$ comes from reaction mechanism r1. Reaction formula s1 shows that the $NaBH_4$ produced is used to produce $H_2$ in the chemical reaction with $H_2O$, preferably supplied as ultra-pure water (UPW), and to generate energy, which is shown in the table below. The transfer of $NaBH_4$, a metal borohydride in general, from the $NaBH_4$ synthesis side to the $H_2$ production side is indicated by arrow 10. The reaction products from reaction formula r1 are NaOH, $B_2O_3$ and $H_2$.

| FIG. 2A, Reaction r1: $H_2$ production | | | |
|---|---|---|---|
| | Gibbs energy [kJ/mol] | # molecules [mole] | Δ Gibbs energy [kJ] |
| $NaBH_4$ | −123.9 | 4 | 495.6 |
| $H_2O$ | −237.1 | 10 | 2,371.0 |
| NaOH | −379.5 | 4 | −1,518.0 |
| $B_2O_3$ | −1,194.4 | 2 | −2,388.8 |
| $H_2$ | 0 | 16 | 0 |
| Reaction r1: | | | −1,040.2 |

NaOH and $B_2O_3$ can be collected and returned in a spent fuel SF to be used again in reaction mechanism s1 so as to newly produce $NaBH_4$, as is shown by arrow 20. The $H_2$ produced in the process of formula r1 is, at least partly, returned back to the process of formula s1, as indicated by arrow 30. Energy released in process r1 may also be reused in reaction process s1 so that the amount of energy that need to be supplied from external sources, in an ideal situation, is decreased to 3,411.2−1,040.2=2,371.0 kJ. The reaction process s1 requires the input of energy from external sources.

The process of energy production according to reaction formula r2 generates $H_2O$ that can be discharged as a clean reaction product. The process of formula r2 generates a large amount of energy as is shown in the table below.

| FIG. 2A, Reaction r2: Energy production | | | |
|---|---|---|---|
| | Gibbs [kJ/mole] | # molecules [mole] | Δ Gibbs [kJ] |
| $H_2$ | 0 | 16 | 0 |
| $O_2$ | 0 | 8 | 0 |
| $H_2O$ | −237.1 | 16 | −3,793.6 |
| Reaction r2: | | | −3,793.6 |

The process cycle of FIG. 2 in combination with the corresponding tables above show that power, preferable power that has been produced in a zero carbon-footprint (carbon-free) manner, can be used to produce in a synthesis mechanism s1 a metal borohydride, for instance, $NaBH_4$, that is subsequently in a reaction process r1 used to produce $H_2$, which can be transferred back to the metal borohydride synthesis process s1. The reaction mechanisms s1 and r1 correspond to the synthesis process S and reaction process R, respectively, of FIG. 1.

The following table shows the mole balance and the energy balance for the atoms involved in the reaction formulas s2, s1, r1 and r2 of FIG. 2A per mole $H_2$ produced according to reaction formula r2 in an energy production reactor such as, for instance, a fuel cell or a burner to generate steam.

| | H in & out | O in & out | Na in & out | B in & out | Energy [kJ] |
|---|---|---|---|---|---|
| Reaction s2: Initial $H_2$ production | 0.750 | 0.375 | 0.000 | 0.000 | 88.91 |
| Reaction s1: $NaBH_4$ production | 1.000 | 0.625 | 0.250 | 0.250 | 213.19 |
| Reaction r1: $H_2$ production | 2.250 | 0.625 | 0.250 | 0.250 | −65.0 |
| Reaction r2: Energy production | 2.000 | 1.000 | 0.000 | 0.000 | −237.10 |
| Total: | | | | | 0.00 |

The energy and mole balance in the table show that the $NaBH_4$ production process according to reaction s1 requires $H_2$ and 213.19 kJ energy per mole $H_2$ produced in the energy production reaction r2. The $NaBH_4$ synthesis reaction s1 (S) requires 2 mole NaOH, 1 mole $B_2O_3$ and 3 mole $H_2$ to produce 2 mole $NaBH_4$. The process of reaction formula r1 (R) generates 8 mole $H_2$ from 2 mole $NaBH_4$ and 5 mole $H_2O$. Reaction mechanisms s1 (S) and r1 (R) together imply a hydrogen multiplication efficiency of 3:8, or 1:2.67, of the 3 mole $H_2$ used in the metal borohydride synthesis reaction s1 to the 8 mole $H_2$ generated in the metal borohydride decomposition and $H_2$ production reaction r1.

An optimal reaction process would be one in which at least 5 mole $H_2O$ is used for 2 mole $NaBH_4$ in the reaction process r1. Preferably, a larger amount of water is used to keep the reaction products in a liquid state. Below two examples are given in which an amount of $NaBH_4$ is used that has an hydrogen content equivalent to 1 kg $H_2$. In a first example a fuel mixture (borohydride fuel) is used having 33.33% wt $NaBH_4$, 5% wt NaOH and the remainder ultrapure water (UPW):

9.38 kg $NaBH_4$, which is 248.05 mole;
1.41 kg NaOH, which is 35.19 mole; and
17.36 kg UPW, which is 936.69 mole.

This gives a total mass of 28.15 kg, and 1 kg of $H_2$ is 3.6% wt of such amount. A ratio of $H_2O:NaBH_4$ of 2:1, which is the ratio required by the basic equation Rb, would require 8.937 kg of UPW and therefore the 17.36 kg of UPW in the mixture is sufficient. A ratio of $H_2O:NaBH_4$ of 5:2, which is the ratio required for reaction formula 3, would require an amount of 11.172 kg UPW and therefore the 17.36 kg of UPW in the mixture is also sufficient.

In a second example a fuel mixture (borohydride fuel) is used having 66.66% wt $NaBH_4$, 5% wt NaOH and the remainder UPW:

9.38 kg $NaBH_4$, which is 248.05 mole;
0.70 kg NaOH, which is 17.60 mole; and
3.98 kg UPW, which is 221.35 mole This gives a total mass of 14.06 kg, and 1 kg of $H_2$ is 7.1% wt of such amount. A ratio of $H_2O:NaBH_4$ of 2:1, which is the ratio required by the basic equation Rb, would require 8.937 kg of UPW and therefore the 3.98 kg of UPW in the mixture is insufficient. A ratio of $H_2O:NaBH_4$ of 5:2, which is the ratio required for reaction formula r1, would require an amount of 11.172 kg UPW and therefore the 3.98 kg of UPW in the mixture is also insufficient. The basic reaction formula Rb and reaction formula r1 require an additional 4.96 kg and 7.19 kg of UPW, respectively, which could be obtained from the water produced in a fuel cell according to reaction formula r2, as is shown by arrow 50 on the right-hand side of FIG. 2.

FIG. 2B shows other reaction paths for the blocks s1 and r1, while the molar amounts in the reaction mechanisms of blocks s2 and R2 has been adapted to match the molar amounts of all blocks in FIG. 2B. The corresponding tables showing the Gibbs energies and number of molecules involved are shown below.

| FIG. 2B, Reaction s2: Initial $H_2$ production | | |
|---|---|---|
| Gibbs energy [kJ/mole] | # molecules [mole] | Δ Gibbs energy [kJ] |
| $H_2O$ −237.1 | 2 | 474.2 |
| $H_2$ 0 | 2 | 0 |
| $O_2$ 0 | 1 | 0 |
| Reaction s2: | | 474.2 |

| FIG. 2B, Reaction s1: $NaBH_4$ synthesis | | |
|---|---|---|
| Gibbs energy [kJ/mol] | # molecules [mole] | Δ Gibbs energy [kJ] |
| $NaBO_2$ −906.5 | 1 | 906.5 |
| $H_2$ 0 | 2 | 0 |
| $NaBH_4$ −123.9 | 1 | −123.9 |
| $O_2$ 0 | 5 | 0 |
| Reaction s1: | | 782.6 |

| FIG. 2B, Reaction r1: $H_2$ production | | |
|---|---|---|
| Gibbs energy [kJ/mol] | # molecules [mole] | Δ Gibbs energy [kJ] |
| $NaBH_4$ −123.9 | 1 | 123.9 |
| $H_2O$ −237.1 | 2 | 474.2 |
| $NaBO_2$ −906.5 | 1 | −906.5 |
| $H_2$ 0 | 4 | 0 |
| Reaction r1: | | −308.4 |

| FIG. 2B, Reaction r2: Energy production | | |
|---|---|---|
| Gibbs [kJ/mole] | # molecules [mole] | Δ Gibbs [kJ] |
| $H_2$ 0 | 4 | 0 |
| $O_2$ 0 | 2 | 0 |
| $H_2O$ −237.1 | 4 | −948.4 |
| Reaction r2: | | −948.4 |

The reaction mechanisms s2 and r2 of FIG. 2B are even more favorable as compared to the reaction mechanisms S2 and r2 of FIG. 2A since considerably less energy is required per mole $NaBH_4$. Having $B_2O_3$ as a reaction residue requires 3,411.2 kJ for 4 moles $NaBH_4$. This yields 22.56 MJ/kg $NaBH_4$, which may be expressed as 211.5 $MJ/kgH_2$. Using $NaBO_2$ as a reaction residue requires 782.6 kJ per mole $NaBH_4$. This yields 20.70 MJ/kg $NaBH_4$, which may be expressed as 194.1 $MJ/kgH_2$. 308.4 kJ of energy is released per mole $NaBH_4$ converted to $NaBO_2$, together with 4 moles $H_2$. As a result another kilogram of $H_2$ is released in addition to a kilogram $H_2$ in $NaBH_4$ together with 76.5 MJ of heat.

Figure 2C:
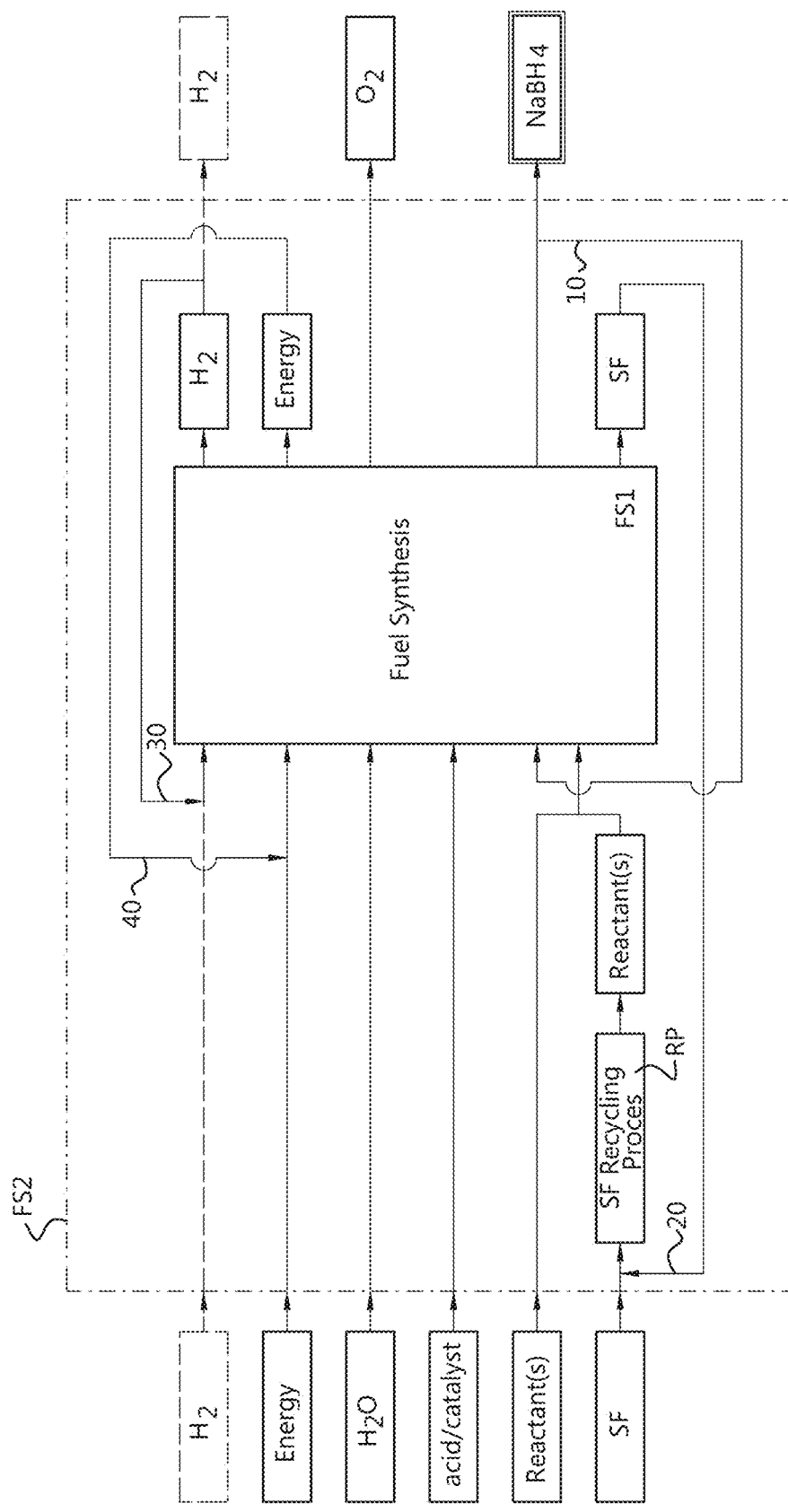
FIG. 2C shows a schematic fuel synthesis process.

FIG. 2C shows a general overview for a fuel synthesis process FS1, FS2. Reaction mechanism block FS1 comprises reaction mechanism blocks s1 and r1 of FIG. 2A or FIG. 2B. Spent fuel SF can be recycled in the process FS2 or additionally be provided. Clean reactants may also be provided into the process. Part of the $H_2$ produced in the synthesis process can be used to keep the synthesis process going. Alternatively, $H_2$ may be externally provided. The synthesis process FS1, FS2 yields a metal borohydride fuel, being $NaBH_4$ in this example.

Figure 2D:
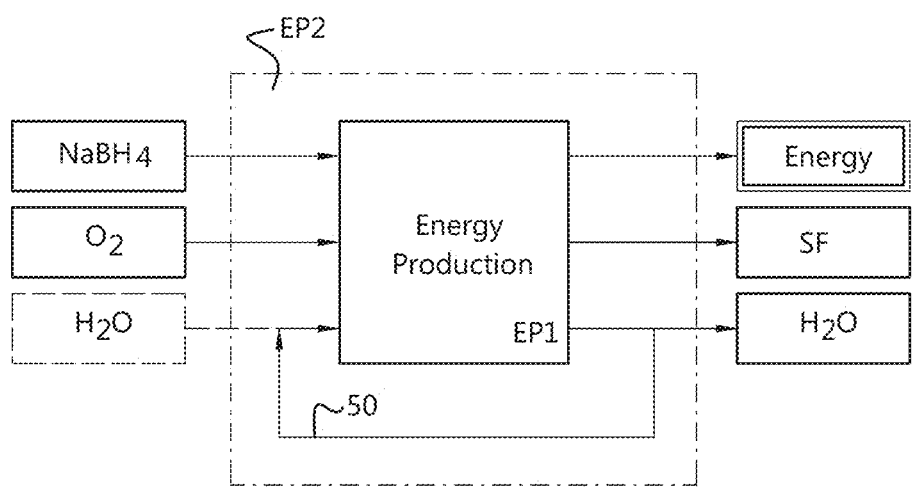
FIG. 2D shows a schematic energy production process.

The metal borohydride fuel can be used in an energy production process EP1, EP2 as shown in FIG. 2D. Reaction mechanism block EP1 comprises reaction mechanism blocks r1 and r2 of FIG. 2A or FIG. 2B. Part or all of the water produced can be recycled into the energy production. The metal borohydride fuel may generally be provided as metal borohydride dissolve in ultrapure water together with a meal hydroxide to stabilize the fuel mixture as a metal borohydride tends to react quite fast with ultrapure water.

Figure 3:
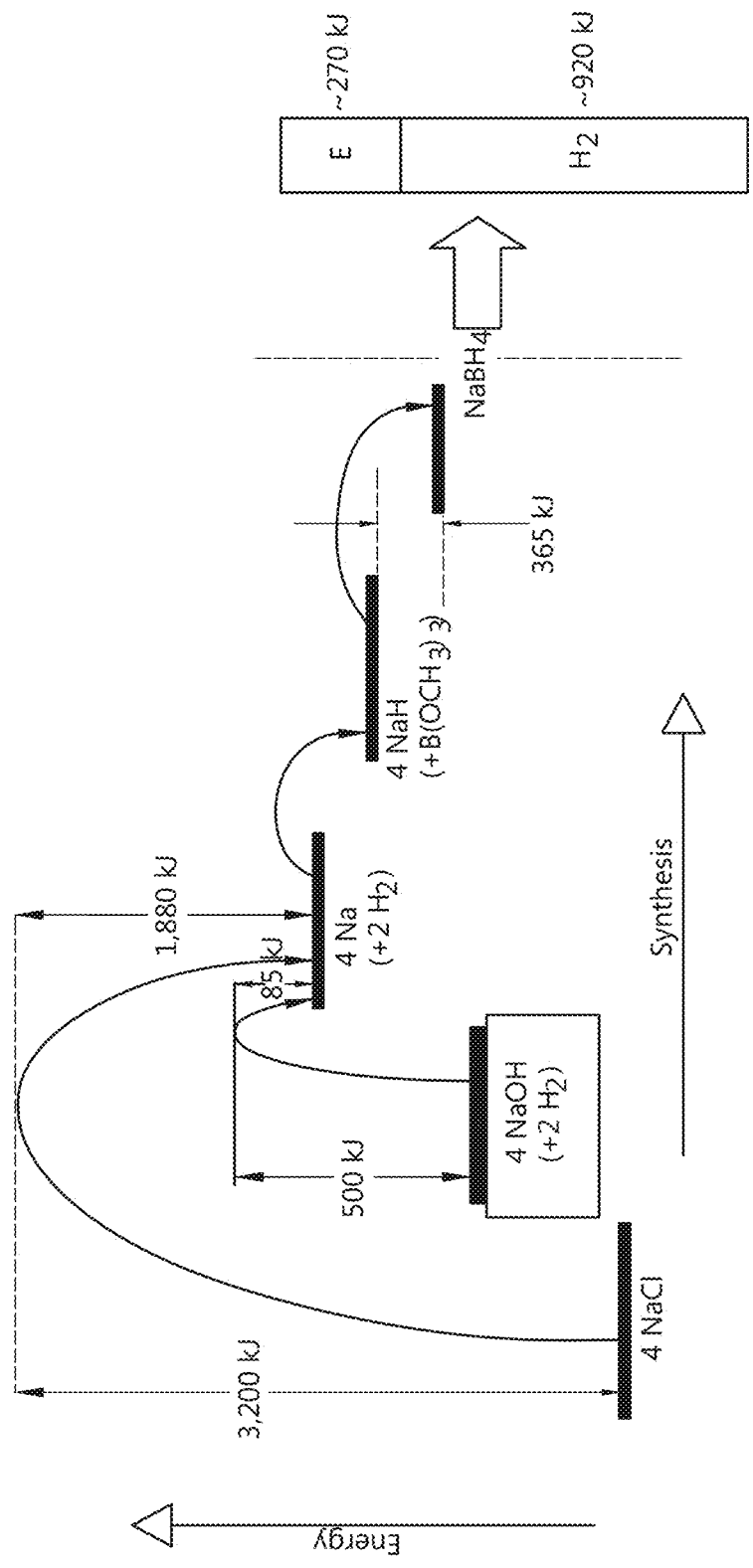
FIG. 3 shows energy levels of synthesis steps for synthesizing a metal borohydride in an embodiment of the invention.
Figure 4:
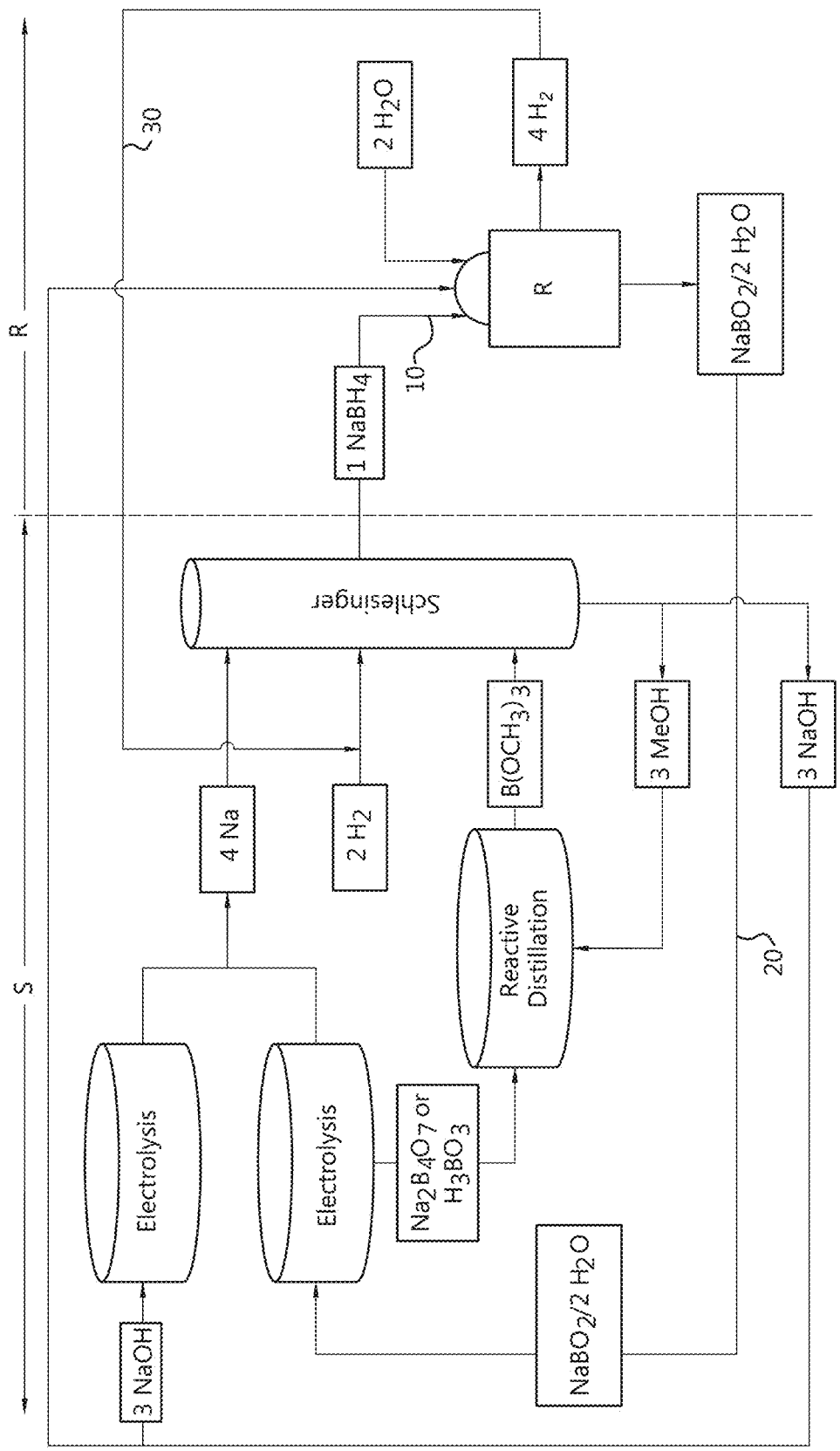
FIG. 4 shows a schematic representation of an embodiment of the invention employing a synthesis process proposed by Ying Wu.

Two other examples are presented in relation to FIG. 3. FIG. 3 shows the energy levels involved for two synthesis paths for NaBH$_4$ based on electrolysis. The figure shows that taking NaOH as a starting material requires considerably less energy as compared to taking NaCl as a starting material. The energies required are 500 kJ and 3,200 kJ, respectively. The process at first taking NaH as a starting point has been described by Brown and Schlesinger in U.S. Pat. No. 2,534,533. Subsequently, Ying Wu has proposed to replace the commonly used NaCl by NaOH in the electrolysis process in a publication referred to in the Background of the Invention section. FIG. 4 presents a schematic overview of the reaction steps involved in the process employing NaOH electrolysis according to the scheme of Ying Wu for synthesizing NaBH$_4$ on the left-hand side of the figure, and the reaction process R of NaBH$_4$ and H$_2$O on the right-hand side of the figure.

Figure 5:
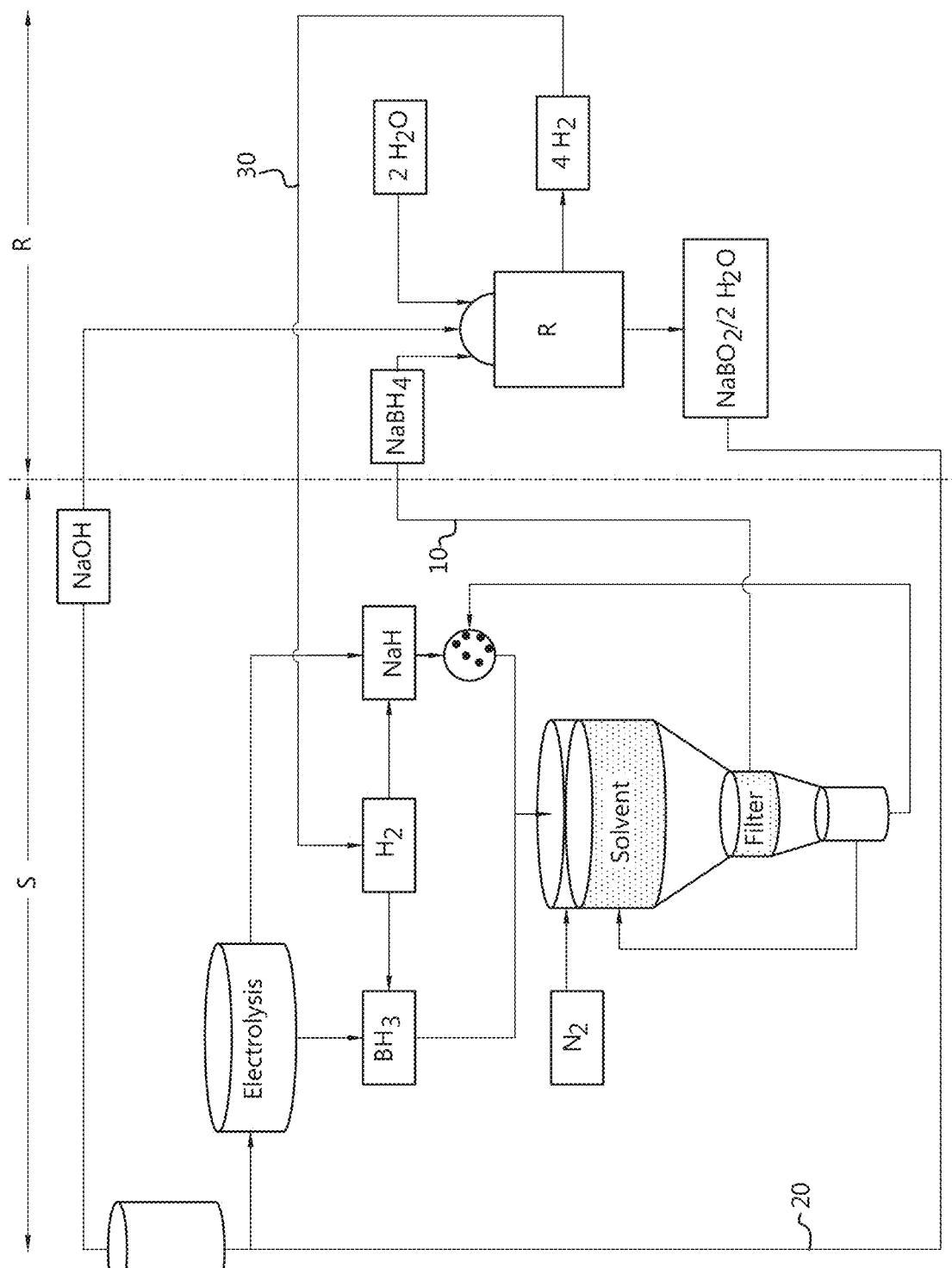
FIG. 5 shows an a schematic representation of an embodiment of the invention employing a synthesis process proposed by Richter and Jensen.

Yet another example of a combined synthesis process S and reaction process R is shown in FIG. 5, which shows a process that has been proposed by Richter and Jensen and which is disclosed in WO 2013/182208 A1. The process is based on activating a metal by ball milling and subsequently producing a hydride of the activated metal, which is dissolved in a solvent at low pressure. Minkina has disclosed yet another example in EP 1787952.

It has been described above that several chemical processes can be employed in the process cycle of the invention as shown in FIG. 1. The reaction process R yields a larger amount of H$_2$ as is required as an input for the metal borohydride synthesis process S for a same amount of metal borohydride resulting from the synthesis process S and entering the reaction process R. The amount of metal borohydride and H$_2$ produced will therefore increase in time. The method thus is a method for producing a metal borohydride and/or H$_2$. Metal borohydride and H$_2$ produced can be withdrawn from the process for use elsewhere. Not all metal borohydride or H$_2$ is to be taken from the process, otherwise the process would end. It is therefore to be monitored, or otherwise guaranteed, that a minimum amount of metal borohydride and H$_2$ is maintained in the process. This can be achieved in various manners, for instance, by software control, by keeping stocks in separate storage containers for running the process and for withdrawing from the process. In the latter example the storage container for keeping the process running is to be kept filled at a desired level.

Figure 6:
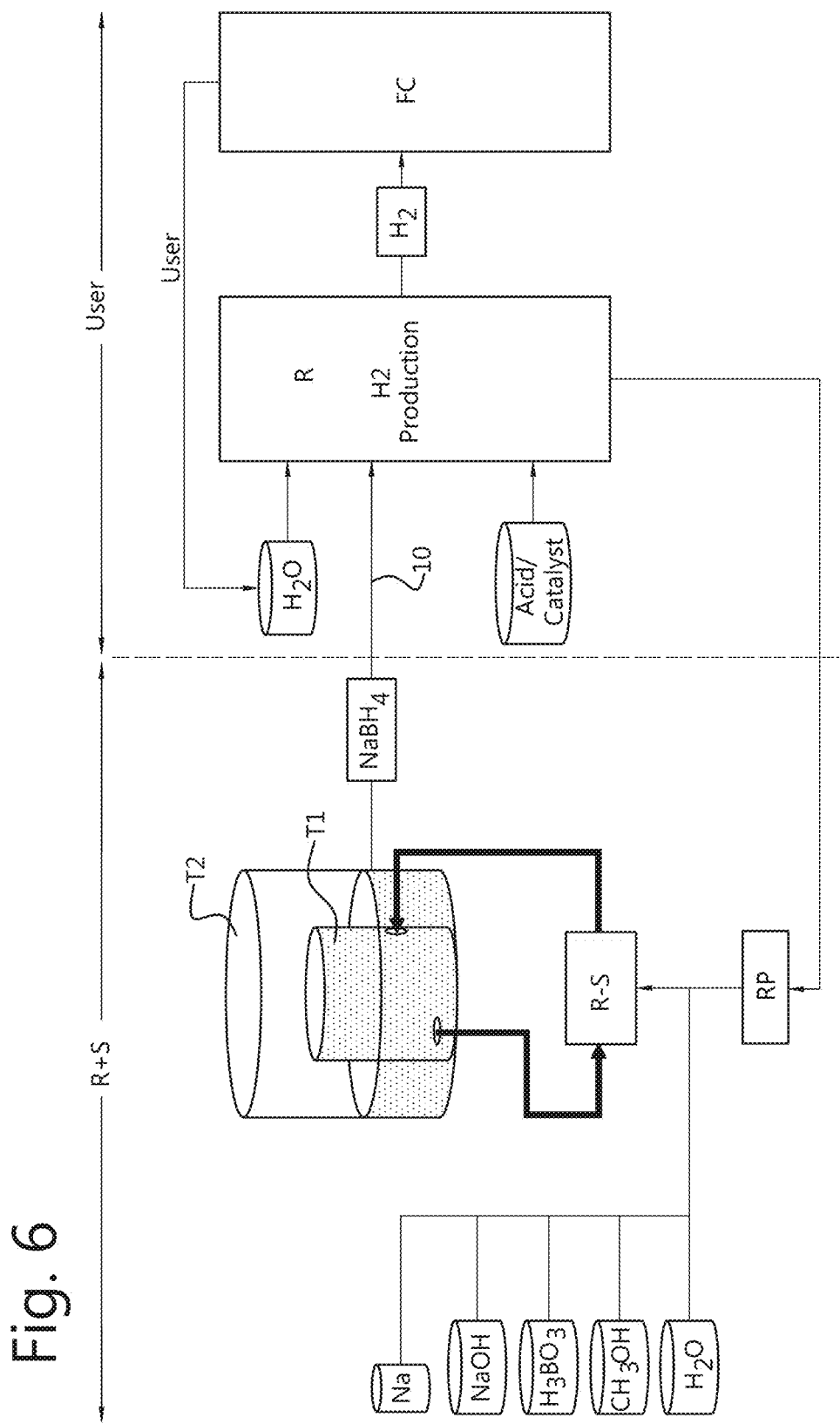
FIG. 6 shows a schematic representation of yet another embodiment of the invention.

An embodiment of the invention in which metal borohydride is withdrawn from the production cycle is shown in FIG. 6. The block R-S represents consecutive processes for metal borohydride decomposition and H$_2$ production R and metal borohydride synthesis S, as has been discussed in relation to FIGS. 1 to 5. The metal borohydride produced is provided into a container or tank T1. Metal borohydride is taken from this tank T1 for a next cycle of reaction and synthesis processes R-S. The tank T1 has a predetermined capacity that is considered as required to keep the production cycle R-S running. Any excess metal borohydride which exceeds the capacity of tank T1 overflows into a tank T2. Metal borohydride that is withdrawn from the production cycle is taken from this tank T2. It is shown that NaBH$_4$ is taken form tank T2 and provided to metal borohydride decomposition and H$_2$ production process (reactor) R in combination with a fuel cell FC of a user. The H$_2$O produced by the fuel cell FC is provided back to the reactor R of the user and reaction products form the reactor R of the user are provided back to the metal borohydride production cycle R-S.

Figure 7:
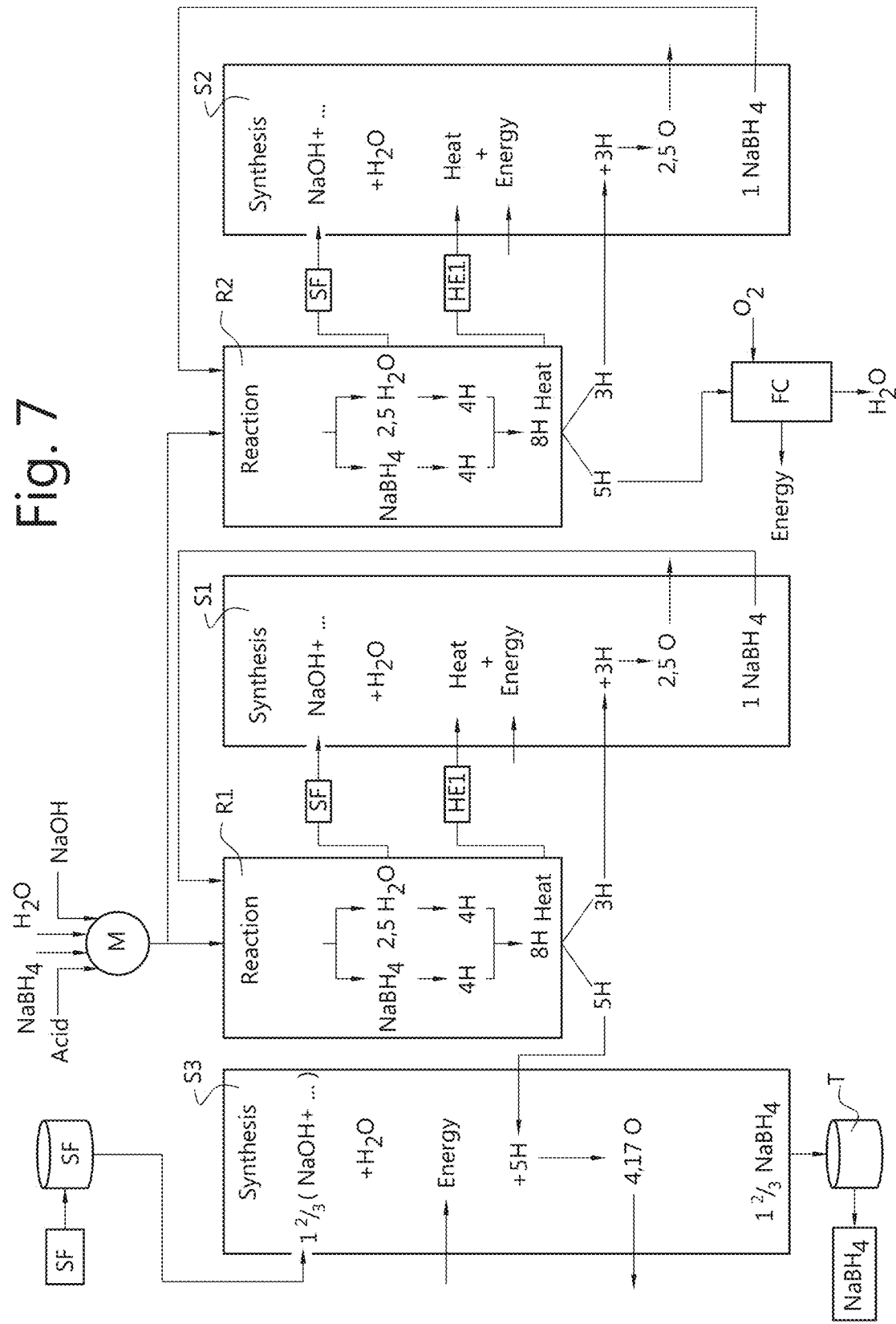
FIG. 7 shows a schematic representation of yet another embodiment of the invention.
Figure 8:
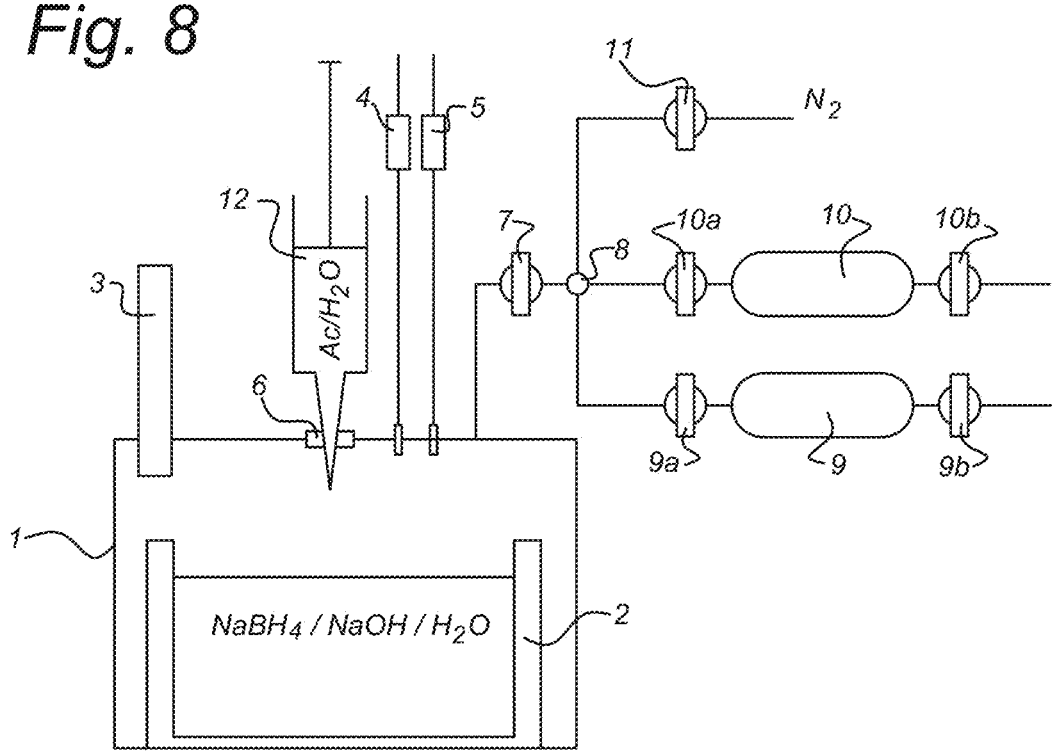
FIG. 8 schematically depicts the reaction setup of experiments carried out.
Figure 9:
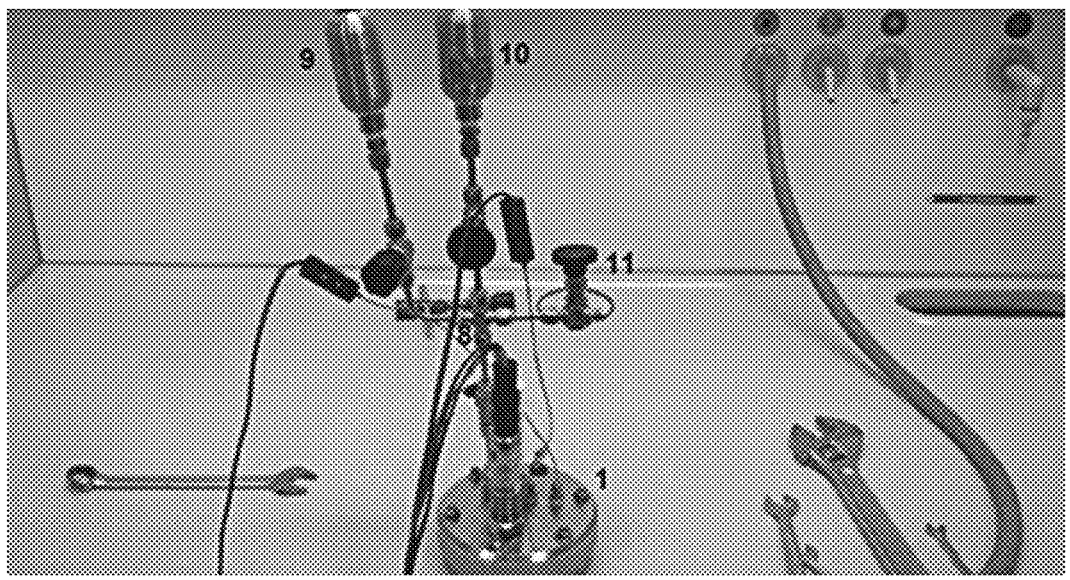
FIGS. 9, 10 and 11 show pictures of the reaction setup of experiments carried out.
Figure 10:
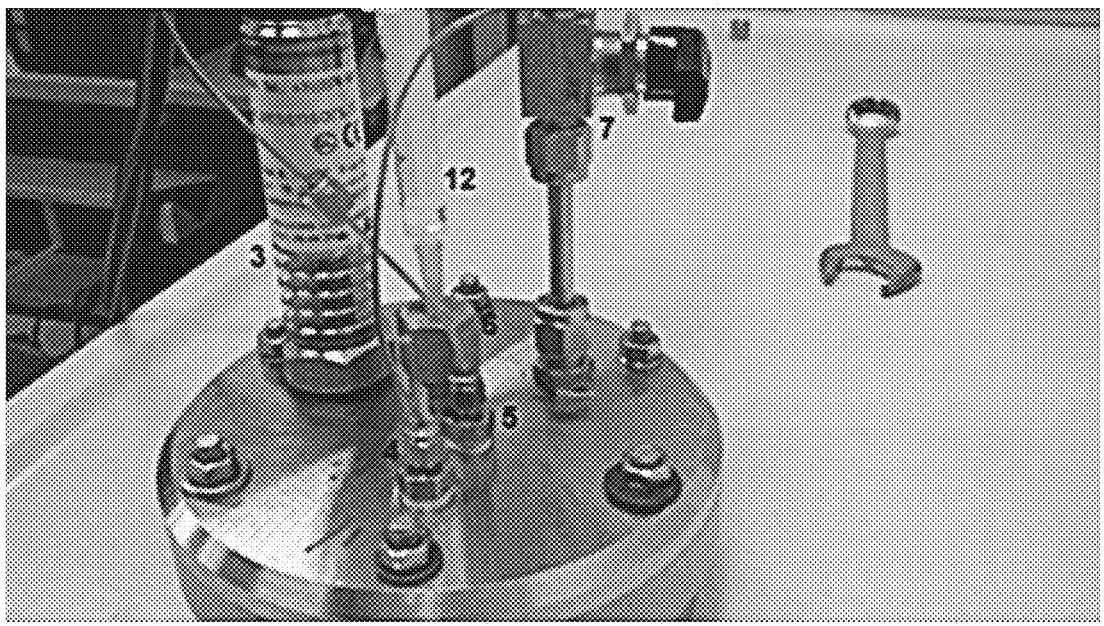
Figure 11:
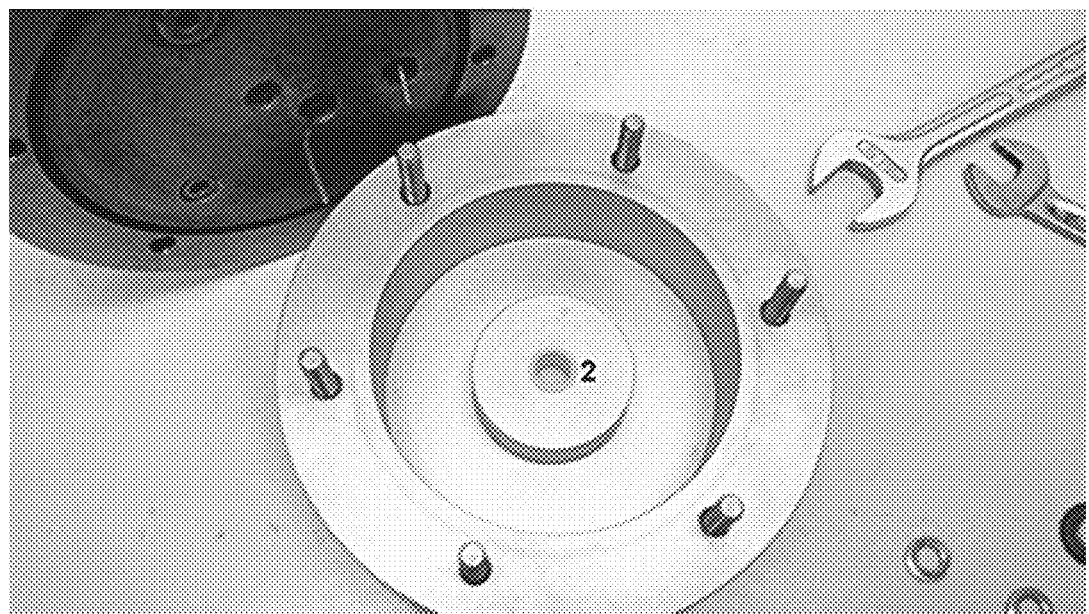

FIG. 7 shows another embodiment of the invention. The figure shows two production process cycles R1-S1 and R2-S2. NaBH$_4$ is mixed with H$_2$O in a mixer M and provided to reaction processes R1 and R2. Only one mixer M is shown, but each production process cycle may also be provided with its own mixer. Additionally and acid and NaOH may be provided into the mixture for controlling the reaction process. Controlling the reaction process by adding an acid and/or a metal hydroxide has been disclosed in a Dutch patent application invoking priority of NL 2015742 and referred to earlier, the contents of which are incorporated herein by reference. The reaction products in a spent fuel SF and a part of the H$_2$ produced are provided to the synthesis processes S1, S2 together with heat produced in the reaction process R1, R2. The spent fuel SF may have to be recycled first, as required. Part of the H$_2$ produced in the R2-S2 production cycle is provided to a fuel cell FC to produce electrical energy. A fuel cell can produce about 83 MJ/kgH$_2$ energy. The H$_2$ could also be used in a coal power plant that has been converted for the use of H$_2$ as a fuel, in which case the amount of energy produces is about 85 MJ/kgH$_2$. Operating costs tend to be higher for a fuel cell as compared to a converted coal power plant. Part of the H$_2$ produced in the R1-S2 production cycle is provided to a synthesis process S3 to produce NaBH$_4$ for use elsewhere. The NaBH$_4$ produced is stored in a tank T. The metal borohydride can be dissolved first into water, preferably ultrapure water (UPW), which is buffered with a metal hydroxide to obtain a stable fuel mixture as has been disclosed in a Dutch patent application invoking priority of NL 2015742 and referred to earlier, the contents of which are incorporated herein by reference. The spent fuel SF, recycled if required, from one or more reaction processes for the decomposition of NaBH$_4$ and the production of H$_2$ elsewhere can be returned to the synthesis process S3, or to another synthesis process.

Experiments

Below experiments and experimental results are discussed on the preparation of a fuel mixture for producing H$_2$ and the production of H$_2$ from the fuel mixture. Details are provided of the materials used, the reaction setup, the experiments and the results thereof.

Materials

All chemicals were purchased from Sigma-Aldrich except for the ultrapure water (UPW), which was obtained from the Pure Water Group. The following chemicals were used to prepare fuel and activator solutions.

| Chemical | Grade | Purity | Order no. | Batch no. |
|---|---|---|---|---|
| sodium borohydride | granular, 10-40 mesh | 98% | 452874 | MKBR3579V |
| sodium hydroxide | reagent grade, pellets | >98% | S5881 | SZBF0550V |
| hydrochloric acid concentrate | for 1 L standard solution, 0.5M HCl (0.5N) | | 38285 | SZBF0560V |
| ultrapure water (UPW) | ASTM type E-1 | | | |

The alkaline solution was prepared by taking 30.837 gram UPW in a beaker and adding 2.505 gram of NaOH and stirring the resulting mixture until all NaOH pellets were dissolved completely.

The activator solution was prepared by mixing hydrochloric acid concentrate with the same amount of ultrapure water. 75.637 gram of hydrochloric acid concentrate was weighed in a beaker. 75.633 gram of UPW was weighed in another (different) beaker, and the hydrochloric acid was added to the UPW. Both beakers were flushed with the solution to ensure a homogeneous solution.

5 gram of fuel (also referred to as fuel mixture or fuel solution) was prepared by mixing 3.331 gram of alkaline solution with 1.666 gram of sodium borohydride. The mixture was stirred until no solids remained in solution. A short heating (a few seconds on a heating plate) of the mixture helped dissolving the solid. The pH value of the fuel solution was determined to be pH=13.5. The final composition of the $H_2$ generating fuel used in the experiments is given below.

| Compound | Amount (gram) | % wt |
|---|---|---|
| $NaBH_4$ | 1.666 | 33.34 |
| NaOH | 0.250 | 5.00 |
| UPW | 3.081 | 61.66 |
| Total: | 4.997 | 100.00 |

Reaction Setup

The reaction setup is shown in FIGS. 8 to 11. The reactor setup comprises a stainless steel reaction vessel 1 (having a volume of 182.4±1.5 ml) with a Teflon insert 2. The Teflon insert 2 is the actual reaction mixture container and is replaced with a new one in each reaction. On top of the reaction vessel are provided a pressure sensor 3, temperature sensors 4, 5 (thermocouples) for gas and liquid phases, respectively, a septum 6 and a valve 7. The sensor 3, 4 and 5 were connected to a data acquisition computer.

The specifications of the pressure sensor and the temperature sensors used are given below.

| Designation | Sensor type | Range | Calibrated range | Accuracy |
|---|---|---|---|---|
| Pressure | AE sensors ATM 2.5 bar abs | 0-2.5 bara | 0-2.4 bara | 0.0125 bara |
| Temperature reaction medium | Omega engineering Type T | −250-350° C. | 0-100° C. | 1.4° C. |
| Temperature gas medium | Omega engineering Type T | −250-350° C. | 0-100° C. | 1.4° C. |

The sensors were calibrated and the calibration logs are given in the tables below.

Pressure sensor
Results of polynomial fit of input data set.
Fitted to function: $Y = a + b \cdot X$

| a = −3.33977748360518E+0001 | CC = 0.999993998801983 |
|---|---|
| b = 2.51274942241271E+0004 | Linearity: +0.169%; −0.185% |

| STATISTICS | | | |
|---|---|---|---|
| input: | 10 points | output: | 10 points |
| minimal X value: | 7.69999E−01 | maximal error LSO: | 0.44010720% |
| maximal X value: | 9.5990000 | average error LSO: | 0.16192703% |
| minimal Y value: | 1.92600E+04 | maximal error FSO: | 0.18505821% |
| maximal X value: | 2.40960E+05 | average error FSO: | 0.07577616% |
| | | standard deviation: | 261.38961904 |

Temperature liquid reaction medium ($T_{liq}$) thermocouple signal amplifier
Results of polynomial fit of input data set.
Fitted to function: $Y = a + b \cdot X$

| a = 2.73696307682517E+0002 | CC = 0.999978525273946 |
|---|---|
| b = 1.50113170585922E+0001 | Linearity: +0.047%; −0.146% |

| STATISTICS | | | |
|---|---|---|---|
| input: | 11 points | output: | 11 points |
| minimal X value: | 0.00000E+00 | maximal error LSO: | 0.19960360% |
| maximal X value: | 6.6420000 | average error LSO: | 0.04954811% |
| minimal Y value: | 273.1500000 | maximal error FSO: | 0.14630571% |
| maximal X value: | 373.1500000 | average error FSO: | 0.04024681% |
| | | standard deviation: | 0.22911342 |

Temperature gas reaction medium ($T_{gas}$) thermocouple signal amplifier
Results of polynomial fit of input data set.
Fitted to function: $Y = a + b \cdot X$

| a = 2.72150413620245E+0002 | CC = 0.999999761705112 |
|---|---|
| b = 1.50265967609884E+0001 | Linearity: +0.012%; −0.006% |

| STATISTICS | | | |
|---|---|---|---|
| input: | 11 points | output: | 11 points |
| minimal X value: | 6.55000E−02 | maximal error LSO: | 0.01282300% |
| maximal X value: | 6.7220000 | average error LSO: | 0.00551510% |
| minimal Y value: | 273.1500000 | maximal error FSO: | 0.01179027% |
| maximal X value: | 373.1500000 | average error FSO: | 0.00469818% |
| | | standard deviation: | 0.02412944 |

The valve 7 is connected to a quadruple connector 8. Two gas chromatography (GC) vials 9, 10 of 50 ml each are connected to the quadruple connector 8 with respective valves in between vial and connector. Further, another valve 11 is connected to the quadruple connector 8 for enabling the addition and evacuation of gases to and from the reaction vessel 1.

Before experiments were started, tubing and GC vials were under vacuum. Once the insert with the fuel in it was placed in the reaction vessel 1, the tubing and the reaction vessel were filled with nitrogen (purity grade N50, Air Liquide) at atmospheric pressure. Air was removed by alternatingly adding nitrogen (5 bar) and applying vacuum for three consecutive times, then pressurizing with nitrogen (5 bar) and finally open the gas evacuation valve until the pressure inside the vessel equalled ambient pressure. With the reaction setup containing fuel and being filled with nitrogen, the setup is ready for activator injection by a syringe 12 passing through the septum 6 into the insert 2 inside the reaction vessel 1.

Execution of Experiments

The $H_2$ generation experiment was performed three times on 29 Oct. 2015 following the protocol 15EM/0678 of the institute TNO in the Netherlands. Fuel is inserted in the insert 2, and the reactor 1 is filled with nitrogen as described previously. To add the activator solution, the following steps were executed. First, a clean, disposable syringe 12 (having a volume of 2 ml) was equipped with a disposable stainless steel needle (having an inner diameter of 0.9 mm). The syringe was flushed with the activator solution, leaving no air in the syringe or needle. The mass of the flushed syringe was determined. The balance was tared with the syringe, and the syringe was filled with the required amount of activator (also referred to as activator solution or activator mixture). The mass of syringe plus activator was determined. Next, the syringe was emptied slowly (in the course of 20-40 seconds) into the Teflon insert 2 by injecting it through the septum 6, without letting any gas enter the syringe or needle. When addition of the activator was complete the syringe was removed and weighed. The exact amount of activator added was determined by subtracting the weight of the emptied syringe from the combined mass of syringe and activator. The exact amounts of fuel and activator added in the experiments are given below.

| Experiment reference | Fuel [gram] | Activator [gram] |
|---|---|---|
| YPEvG119 | 0.2008 | 0.3352 |
| YPEvG120 | 0.1993 | 0.3331 |
| YPEvG121 | 0.2001 | 0.3554 |

The GC vials were filled with the gas mixture from the reaction vessel about 30 minutes after the pressure in the vessel was considered stable (typically about 15 minutes after addition of the activator was completed). Experiment YPEvG119 was terminated earlier due to a malfunction of the data acquisition software. The total data recording time from the moment of addition of the activator was 1,610 seconds (26.7 minutes). The experiment showed a stable pressure in the reaction vessel and hence the experiment was considered successful. The GC vials were filled by opening the valves connecting the vials to the quadruple connector and the reaction vessel. Due to the maintained vacuum in the vials, they quickly filled with the gas phase when their respective valves were opened. The filled vials were allowed to equilibrate for 5 minutes, then their respective valves were closed and the vials were sent to be analyzed by gas chromatography (GC).

After filling the GC vials, any excess pressure in the reaction vessel was released and the vessel was opened. The Teflon insert was removed. The solid left behind in the insert 2 was dried in a vacuum stove at 30° C.

Pressure and Temperature Profiles

Figure 12:
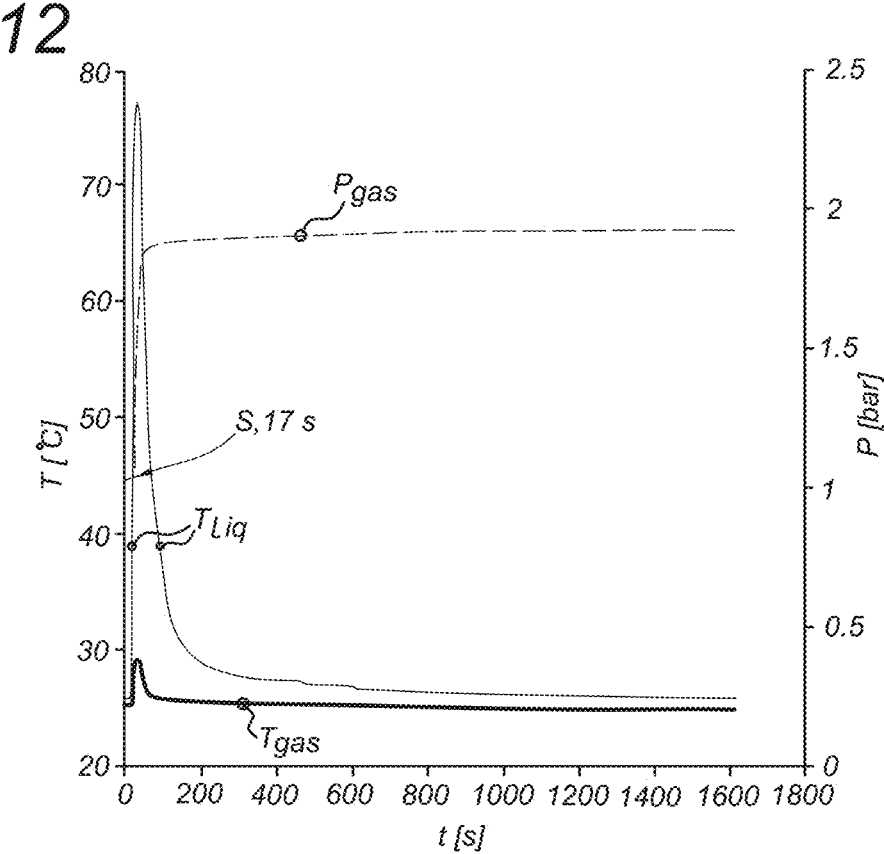
FIGS. 12, 13 and 14 show graphs of temperatures and pressure monitored for three experiments carried out.
Figure 13:
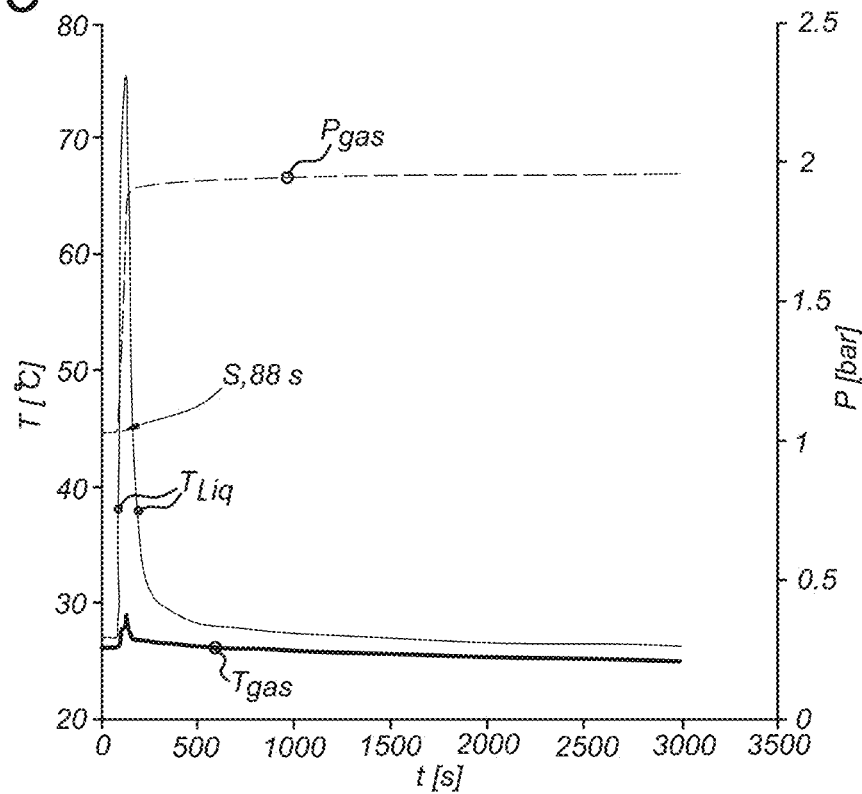
Figure 14:
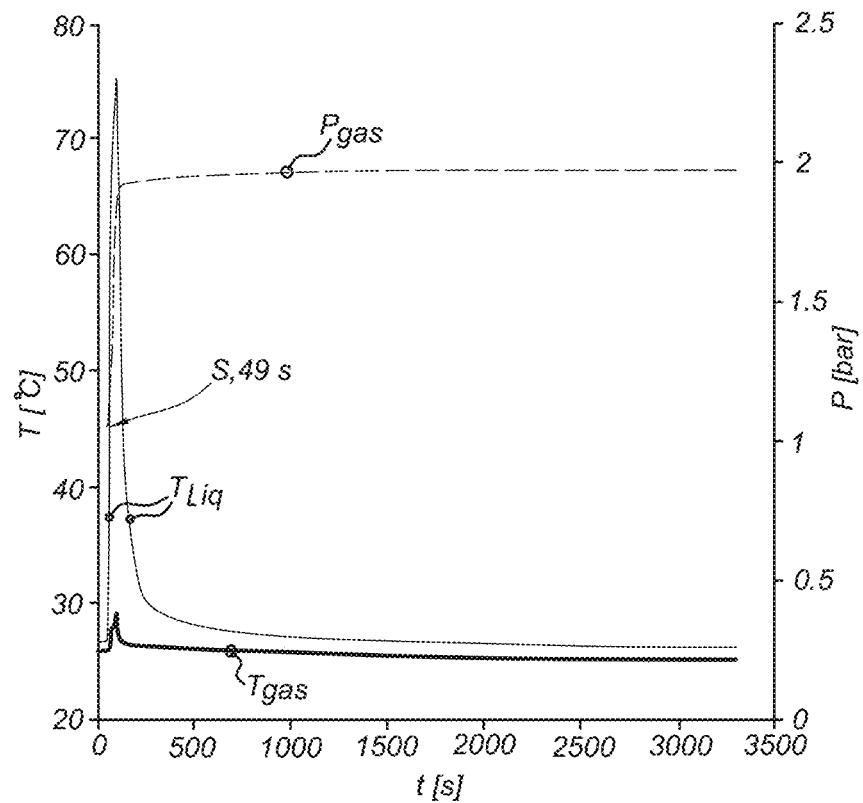
Figure 15:
FIG. 15 shows solid residue obtained in an experiment.

The pressure and temperature profiles of experiments YPEvG119, YPEvG120 and YPEvG121 are given in FIGS. 12 to 14, respectively. The reaction started when the activator solution was added, which is indicated by S together with the time in seconds after start of the taking measurements in FIGS. 12 to 14. It is followed by a rapid increase in temperature of the liquid ($T_{liq}$), which peaks at 75-77° C. Simultaneously, the gas pressure showed a rapid increase indicating the production of gas. The resulting stable pressure and corresponding temperature, as well as the starting pressure and temperature are given below.

| Experiment reference | $P_{start}$ [bara] | $T_{start}$[1] [° C.] | $P_{end}$ [bara] | $T_{end}$ [° C.] |
|---|---|---|---|---|
| YPEvG119 | 1.03 | 25.3 | 1.92 | 24.8 |
| YPEvG120 | 1.03 | 26.2 | 1.96 | 25.0 |
| YPEvG121 | 1.04 | 25.8 | 1.97 | 25.1 |

[1]$T_{start}$ was higher due to the preflushing with nitrogen and applying a vacuum The increase in gas temperature ($T_{gas}$) is much less pronounced due to the rapid cooling through interaction with the reactor vessel walls.

Gas Chromatography (GC) Results

Figure 16:
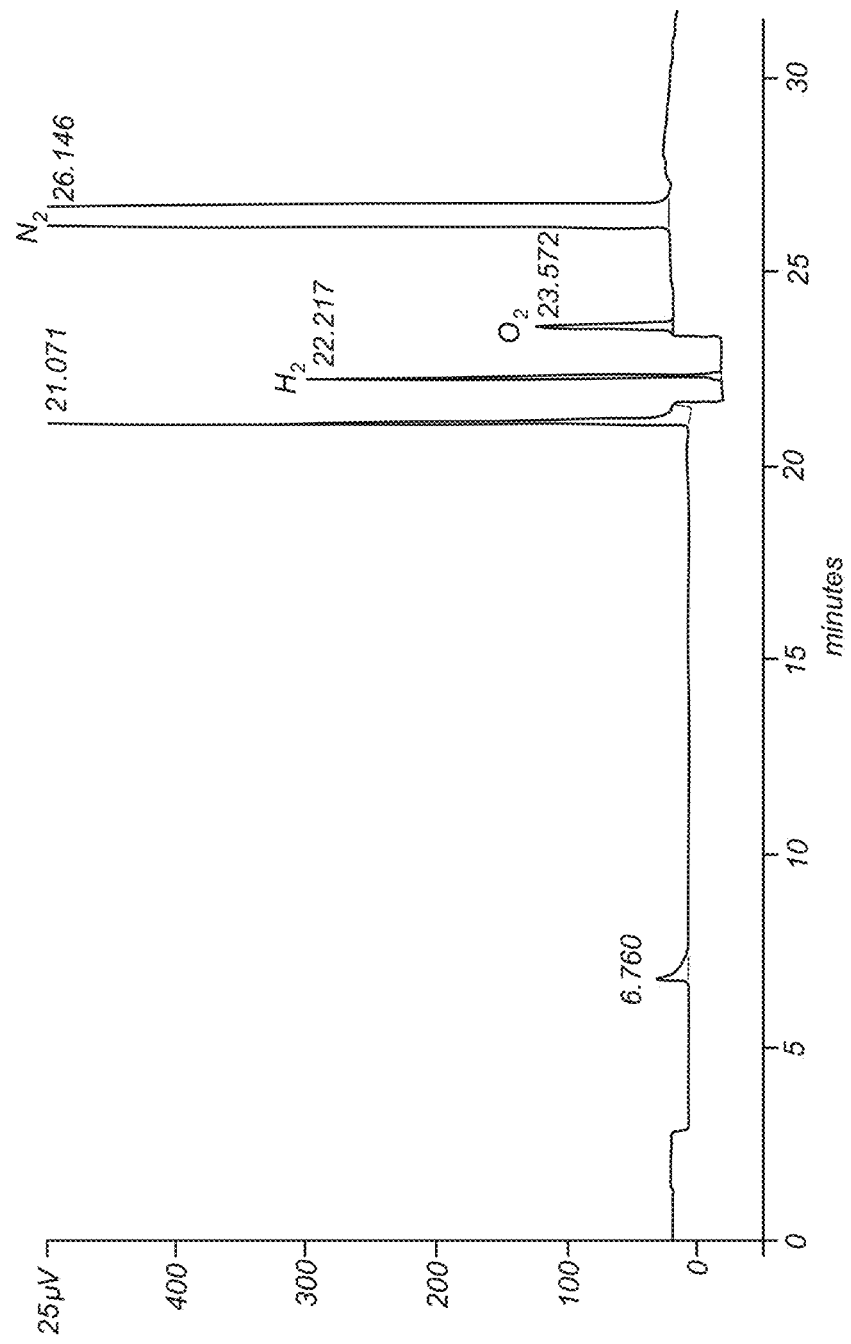
FIG. 16 shows a gas chromatography (GC) graph from a GC measurement carried out on the gas produced in an experiment.

The gas chromatography (GC) analysis plot for experiment YPEvG-121 is given in FIG. 16 as an example. The analysis is reported in report 15EM/0712 of institute TNO in the Netherlands. The following table shows the results form analyzing the plot of FIG. 16.

| RetTime [min] | Type | Area [25 µV s] | Amt/Area | Amount [% vol] | Name |
|---|---|---|---|---|---|
| 2.932 | — | | | | carbon dioxide ($CO_2$) |
| 4.527 | — | | | | ammonia ($NH_3$) |
| 22.217 | BB | 1319.35925 | 3.44871e−2 | 45.50090 | hydrogen ($H_2$) |
| 23.572 | BB | 652.65613 | 8.44455e−4 | 5.51139e−1 | oxygen ($O_2$) |
| 26.146 | BB | 6.81704e4 | 7.76071e−4 | 52.90504 | nitrogen ($N_2$) |
| 28.397 | — | | | | methane ($NH_4$) |
| 31.683 | — | | | | carbon monoxide (CO) |
| Total: | | | | 98.95708 | |

The hydrogen ($H_2$) and nitrogen ($N_2$) concentrations derived from the gas chromatography measurements are given in the table below.

| Experiment reference | $H_2$ gas [% vol] | $N_2$ gas [% vol] | Other [% vol] |
|---|---|---|---|
| YPEvG119 | 45.3 | 53.2 | 1.5 |
| YPEvG120 | 45.2 | 52.9 | 1.9 |
| YPEvG121 | 45.5 | 52.8 | 1.7 |

Because the setup is flushed with nitrogen before each test, other gases in the analyses mostly result from the reaction inside the vessel. As can be seen from the above table, the GC measurement detected almost exclusively hydrogen gas and nitrogen gas. Small amounts of water and oxygen were also detected. The oxygen and to a potentially lesser extent the water were already present before combining the fuel and the activator solution and are therefore included in the starting pressure.

X-Ray Diffraction (XRD) Results

The residue from the reaction before drying is a grey solid. After drying in vacuum a white solid is obtained. The solid obtained from experiment YPEvG119 is shown in FIG.

15. This white residue from experiment YPEvG119 was analyzed using x-ray diffraction (XRD).

The solid residues of the experiments were qualitatively evaluated by XRD. XRD is limited to the identification of crystalline compounds. None of the diffractograms pointed towards large amounts of amorphous compounds. The XRD diffractogram pattern measured is given in FIG. 17. Three library patterns are found to overlap well with the measured pattern. The crystalline solids corresponding to these library patterns identified are given in the table below.

| Pattern reference | Chemical formula | Substance name |
|---|---|---|
| 1 | PDF 00-007-0277 | $Na_2B_4O_7 \cdot 5\,H_2O$ | Tincalconite, syn |
| 2 | PDF 00-005-0628 | NaCl | Halite, syn |
| 3 | PDF 01-075-2259 | $Na_2ClB(OH)_4$ | Teepleite, syn |

Figure 17:
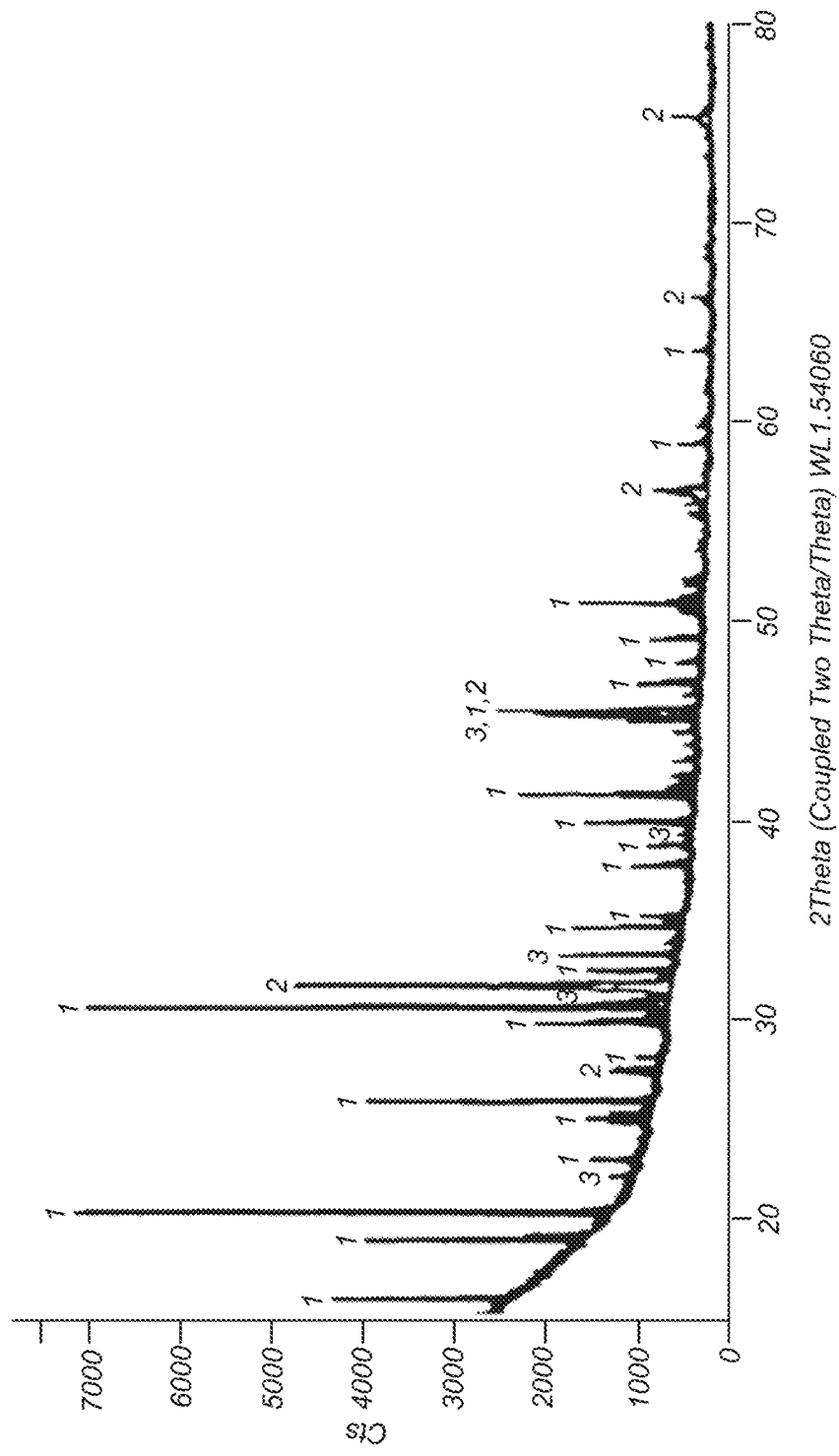
FIG. 17 shows an x-ray diffraction (XRD) graph from an XRD measurement carried out on the residue shown in FIG. 15.

The integer number in the first column of the table above is used to identify peaks of the corresponding pattern in FIG. 17. The peaks identified with '2' thus correspond with pattern PDF 00-005-0628 corresponding to NaCl. The analysis report of the XRD analysis is also reported in report 15EM/0712 of institute TNO in the Netherlands.

Discussion

The GC results indicate that the gas produced is almost completely hydrogen gas in all experiments. Therefore, the pressure increase can be used to determine the absolute value of hydrogen gas produced (applying the ideal gas law, which is applicable due to the low pressures). The molar quantities of hydrogen gas, as well as the starting molar quantities of nitrogen gas are calculated. Both are translated to their respective volume percentages and compared with the GC results. These calculated molar quantities and volume percentages of hydrogen and nitrogen are given in the table below.

| Experiment reference | Pressure based [mol] | | Pressure based [% vol] | | GC results [% vol] | |
|---|---|---|---|---|---|---|
| | $N_2$ | $H_2$ | $N_2$ | $H_2$ | $N_2$ | $H_2$ |
| YPEvG119 | 0.0076 | 0.0066 | 53 | 47 | 53 | 45 |
| YPEvG120 | 0.0075 | 0.0069 | 52 | 48 | 53 | 45 |
| YPEvG121 | 0.0076 | 0.0069 | 53 | 47 | 53 | 46 |

The calculated volume percentages results are consistent with the measured volume percentages the GC experiments. The GC results on hydrogen show a lower concentration of hydrogen gas. The calculated amounts of hydrogen from the pressure values should therefore be seen as maximum values.

In the table below the calculated amounts of hydrogen are compared to the theoretical maximum amounts of hydrogen which can be produced from sodium borohydride according to the reaction formula using the mass of $NaBH_4$ employed in the fuel (the ratio is designated as yield):

$$NaBH_4 + 2H_2O \rightarrow NaBO_2 + 4H_2$$

This is the ideal reaction formula of the decomposition reaction of sodium borohydride. The actual reaction could be different (as also indicated by the XRD results). However, for comparison in relation to the theoretical maximum this is an appropriate reaction equation. The table below also gives the ratio of the mass of hydrogen gas produced and the total mass of the fuel and activator solution applied (designated as efficiency):

| Experiment reference | $H_2$ [mol] | Theoretical $H_2$ [mol] | Yield [% mol] | Fuel [gram] | Activator [gram] | Efficiency [% wt] |
|---|---|---|---|---|---|---|
| YPEvG119 | 0.0066 | 0.0071 | 93 | 0.2008 | 0.3352 | 2.5 |
| YPEvG120 | 0.0069 | 0.0070 | 98 | 0.1993 | 0.3331 | 2.6 |
| YPEvG121 | 0.0069 | 0.0071 | 98 | 0.2001 | 0.3554 | 2.5 |
| Average: | — | — | 96 | — | — | 2.5 |

The yields obtained are close to the theoretical maximum of 100%. Experiment YPEvG119 has a lower yield than the other two experiments. No direct reason can be found, but leakage of some $H_2$ seems likely. It is not likely that it is related to the shorter measurement time because the pressure was already constant (and the reaction completed) for a considerable amount of time as can also be seen in FIG. 12.

CONCLUSIONS

The objective of the experiments was to validate whether the fuel mixture H2Fuel produces hydrogen gas when brought in contact with the activator solution.

The GC analysis indicates that predominately hydrogen gas is produced. Nitrogen and hydrogen gas are detected with small amounts of oxygen and water. The pressure increase can be attributed to the $H_2$ production and therewith used to quantify the amount of $H_2$ produced. The resulting values should be seen as maximum values.

The fuel in reaction with the activator solution produces hydrogen gas with an average of 96% mol of the theoretical maximum, while the maximum in practice is 98% mol due to specifications of the $NaBH_4$ used, and in an efficiency of 2.5% wt in relation to the total mass of fuel and activator solution combined. In this case an overdose is provided to the acid and water in order to obtain the maximum hydrogen conversion in the shortest possible period of time after injection.

XRD analysis indicate that no sodium borohydride or other crystalline borohydrides remained after reaction. Minerals detected were predominately kitchen salt and sodium borates. This indicates the reaction reached completion.

The invention claimed is:

1. A method for producing at least one of a metal borohydride and $H_2$, the method comprising the following steps:
   A. producing a metal borohydride in a synthesis process, in which $H_2$ is a reactant, by at least one of:
   A1. providing metal hydroxide, $B_2O_3$ and $H_2$ so as to allow the synthesis process to proceed and to yield metal borohydride and $O_2$ according to an reaction formula $$4Me(OH)_n + 2nB_2O_3 + 6nH_2 \rightarrow 4Me(BH_4)_n + 5nO_2; \text{ and}$$

A2. providing metal boron oxide and $H_2$ so as to allow the synthesis process to proceed and to yield metal borohydride and $O_2$ according to an reaction formula $$Me(BO_2)_n + 2nH_2 \rightarrow Me(BH_4)_n + nO_2,$$

in which Me is a metal and n is a valance of a metal ion;
   B. producing $H_2$ in a chemical reaction process, in which the metal borohydride produced in step A and $H_2O$ are reactants, the amount of $H_2$ produced in step B, as a result of release from the metal borohydride and $H_2O$, being larger than the amount of $H_2$ required as a reactant in steps A1 and/or A2 for a same amount of metal borohydride as the reactant and the reaction product in steps B and A, respectively; and C. providing $H_2$ produced in step B to step A, and repeating steps A, B and C, wherein a part of at least one of metal borohydride and $H_2$ produced in steps A and B, respectively, is withdrawn while leaving an amount of metal borohydride and $H_2$, respectively, to allow repeating steps A, B and C.

2. The method according to claim 1, wherein step A requires energy in the form of heat, energy in the form of heat is produced in step B, and the heat produced in step B is least partly provided to step A.

3. The method according to claim 1, wherein the reaction product of step B is the reactant of step A.

4. The method according to claim 1, wherein the processes of steps A and B are selected such that reaction products of step B are reactants of step A according to at least one of chemical reaction formulas for the chemical reaction step:

$$4Me(BH_4)_n + 10nH_2O \rightarrow 4Me(OH)_n + 2nB_2O_3 + 16nH_2; \text{ and} \quad \text{B1.}$$

$$Me(BH_4)_n + 2nH_2O \rightarrow Me(BO_2)_n + 4nH_2. \quad \text{B2.}$$

5. The method according to claim 1, wherein a ratio of metal borohydride and $H_2O$ is selected to obtain at least one of
increasing a production rate of $H_2$ by increasing said ratio of metal borohydride and $H_2O$, and
yielding reaction products that are at least one of reactants of step A, and
reactants of a recycling process yielding reaction products that are reactants of step A.

6. The method according to claim 5, wherein the ratio of the molar amounts of borohydride, $BH_4$, groups in the metal borohydride and $H_2O$ is at least $BH_4:H_2O=2:5$.

7. The method according to claim 1, wherein at least one of a catalyst and an acid is added in step B to promote at least one chemical reaction in the chemical reaction process to obtain at least one of
increasing a production rate of $H_2$ by increasing said at least one of the catalyst and the acid, and
yielding reaction products that are at least one of reactants of step A, and
reactants of a recycling process yielding reaction products that are reactants of step A.

8. The method according to claim 1, wherein a metal hydroxide is added in step B to obtain at least one of
decreasing a production rate of $H_2$ by increasing addition of the metal hydroxide, and
yielding reaction products that are at least one of reactants of step A, and
reactants of a recycling process yielding reaction products that are reactants of step A.

9. The method according to claim 1, wherein step A is carried out in a first apparatus setup, step B is carried out in a second apparatus setup, an amount of the metal borohydride is provided from the first apparatus setup to the second apparatus setup, and an amount of $H_2$ is provided from the second apparatus setup to the first apparatus setup for cyclically carrying out steps A and B in the first and second apparatus setups.

10. The method according to claim 1, wherein $H_2O$ is provided in ultrapure water, UPW.

11. The method according to claim 10, wherein the UPW satisfies at least one of having an electrical conductance below 1 µS/cm and having an Electronics and Semiconductor Grade Water ASTM Type E-1 classification or better.

12. A method for producing energy, the method comprising the step of
producing $H_2$ employing the method according to claim 1; and
providing $H_2$ from the preceding step and $O_2$ to allow a chemical reaction to proceed and to yield energy.

13. The method according to claim 1, wherein the metal, Me, is at least one of lithium, Li, sodium, Na, and potassium, K.

14. The method according to claim 2, wherein the processes of steps A and B are selected such that reaction products of step B are reactants of step A.

15. The method of claim 12, wherein the step of providing $H_2$ and $O_2$ to allow a chemical reaction to proceed and to yield energy occurs according to the reaction formula $$H_2 + O_2 \rightarrow 2H_2O.$$

16. The method according to claim 11, wherein the UPW has an electrical conductance below 0.06 µS/cm.

17. The method according to claim 11, wherein the UPW has an electrical conductance below 0.1 µS/cm.

18. The method according to claim 11, wherein the UPW has an electrical conductance below 0.5 µS/cm.

19. A method for producing a metal borohydride, wherein the method comprises at least one of the steps of
providing metal hydroxide, $B_2O_3$ and $H_2$ to allow a synthesis process to proceed and to yield metal borohydride and $O_2$, wherein the synthesis process proceeds according to the reaction formula $$4Me(OH)_n + 2nB_2O_3 + 6nH_2 \rightarrow 4Me(BH_4)_n + 5nO_2; \text{ and}$$

providing metal boron oxide and $H_2$ to allow a synthesis process to proceed and to yield metal borohydride and $O_2$ according to reaction formula $$Me(BO_2)_n + 2nH_2 \rightarrow Me(BH_4)_n + nO_2,$$

in which Me is a metal and n is a valence of a metal ion.

* * * * *